(12) United States Patent
Namiki et al.

(10) Patent No.: US 9,051,420 B2
(45) Date of Patent: Jun. 9, 2015

(54) POLYCARBONATE RESINS AND PROCESSES FOR PRODUCING THE SAME

(75) Inventors: Shingo Namiki, Kitakyushu (JP); Michiaki Fuji, Yokkaichi (JP); Masanori Yamamoto, Kitakyushu (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 13/479,350

(22) Filed: May 24, 2012

(65) Prior Publication Data
US 2012/0232243 A1 Sep. 13, 2012

Related U.S. Application Data

(63) Continuation of application No. PCT/JP2010/071170, filed on Nov. 26, 2010.

(30) Foreign Application Priority Data

| Nov. 30, 2009 | (JP) | 2009-272413 |
| Nov. 30, 2009 | (JP) | 2009-272414 |
| Nov. 30, 2009 | (JP) | 2009-272415 |
| Dec. 11, 2009 | (JP) | 2009-281977 |

(51) Int. Cl.
| C08G 64/00 | (2006.01) |
| C08G 64/02 | (2006.01) |
| B29C 45/00 | (2006.01) |
| C08J 5/00 | (2006.01) |
| C08G 64/20 | (2006.01) |
| C08G 64/30 | (2006.01) |

(52) U.S. Cl.
CPC ........ *C08G 64/0208* (2013.01); *B29C 45/0001* (2013.01); *C08J 5/00* (2013.01); *C08J 2369/00* (2013.01); *C08G 64/205* (2013.01); *C08G 64/305* (2013.01)

(58) Field of Classification Search
USPC .......................... 528/196, 198, 219, 370, 417
See application file for complete search history.

(56) References Cited

U.S. PATENT DOCUMENTS

| 8,445,624 B2 * | 5/2013 | Fuji et al. ...................... 528/196 |
| 2010/0190953 A1 * | 7/2010 | Fuji et al. ...................... 528/370 |

FOREIGN PATENT DOCUMENTS

| CN | 1805992 A | 7/2006 |
| CN | 101448871 A | 6/2009 |
| EP | 2 223 951 A1 | 9/2010 |
| JP | 61-062522 | 3/1986 |
| JP | 2000-080262 | 3/2000 |
| JP | 2006-028441 | 2/2006 |
| JP | 2006-232897 | 9/2006 |
| JP | 2008-019416 | 1/2008 |
| JP | 2008-024919 | 2/2008 |
| JP | 2008-056844 | 3/2008 |
| JP | 2009-091404 | 4/2009 |
| JP | 2009-091417 | 4/2009 |
| JP | 2009-102536 A | 5/2009 |
| JP | 2009-161745 | 7/2009 |
| JP | 2009-161746 | 7/2009 |
| JP | 2011-111612 | 6/2011 |
| JP | 2011-111613 | 6/2011 |
| JP | 2011-111614 | 6/2011 |
| TW | 200932784 A | 8/2009 |
| WO | 99/55764 | 11/1999 |
| WO | WO 2004/111106 | 12/2004 |
| WO | WO 2009/044907 A1 | 4/2009 |

OTHER PUBLICATIONS

International Search Report issued Feb. 22, 2011 in PCT/JP2010/071170 filed Nov. 26, 2010.
Seiichi Honma; "Porikaboneto Jushi Handobukku"; The Nikkan Kogyo Shinbun, Ltd., 1992.
U.S. Appl. No. 13/686,097, filed Nov. 27, 2012, Namiki, et al.
Combined Chinese Office Action and Search Report issued Feb. 4, 2013 in Chinese Patent Application No. 201080050128.9 (with English-language translation).
Office Action issued Aug. 22, 2013 in Chinese patent application No. 201080050128.9 (w/English translation).
Office Action issued Aug. 30, 2011, in Japanese Patent Application No. 2011-157996, filed Aug. 23, 2011.
Office Action issued Sep. 6, 2011, in Japanese Patent Application No. 2011-168646, filed Aug. 30, 2011.
U.S. Appl. No. 14/041,636, filed Sep. 30, 2013, Namiki, et al.
U.S. Appl. No. 14/041,489, filed Sep. 30, 2013, Namiki, et al.
U.S. Appl. No. 14/042,102, filed Sep. 30, 2013, Namiki, et al.
Combined Taiwanese Office Action and Search Report issued Dec. 6, 2013 in Patent Application No. 099141404 (with English language translation).
Japanese Office Action in Applicaion Serial No. 2010-274593 dated Jan. 16, 2014.
Japanese Office Action issued on Apr. 1, 2014 in Patent Application No. 2009-272415 (w/English translation).
Chinese Office Action issued Apr. 24, 2014 in Patent Application No. 201080050128.9 (w/English translation).
Information Offer Form issued Apr. 21, 2014 in Japanese Patent Application No. 2010-274593 (with English language translation).
Information Offer Form issued on Jun. 27, 2014 in Japanese Patent Application No. 2009-272413 (with English language translation).

(Continued)

*Primary Examiner* — Gregory Listvoyb
(74) *Attorney, Agent, or Firm* — Oblon, McClelland, Maier & Neustadt, L.L.P.

(57) ABSTRACT

The invention is to provide polycarbonate resins having excellent light resistance, transparency, hue, heat resistance, thermal stability, and mechanical strength and to provide processes for efficiently and stably producing a polycarbonate resin which stably shows those performances. The invention includes: polycarbonate resins which at least contain structural units derived from a dihydroxy compound having the portion represented by the following general formula (1) as part of the structure thereof and which have specific properties; and processes for producing the polycarbonate resins.

[Chem. 1]

$$-\!\!\!+\!\!CH_2-\!\!O\!\!+\!\!\!-\quad\quad\quad(1)$$

(The case where the portion represented by general formula (1) is part of —$CH_2$—O—H is excluded.)

33 Claims, No Drawings

(56) References Cited

OTHER PUBLICATIONS

Office Action issued on Jul. 22, 2014 in Japanese Patent Application No. 2009-272413 (with English language translation).
Office Action issued on Jul. 22, 2014 in Japanese Patent Application No. 2009-272414 (with English language translation).
Office Action issued on Jul. 22, 2014 in Japanese Patent Application No. 2009-272415 (with English language translation).
Japanese Office Action issued Mar. 18, 2014 in corresponding Japanese Application No. 2009-272413 drafting date Mar. 13, 2004 with English translation.
Japanese Office Action issued Mar. 18, 2014 in corresponding Japanese Application No. 2009-272414 drafting date Mar. 13, 2004 with English translation.
Japanese Office Action issued Oct. 28, 2014 in Japanese Patent Application No. 2010-274593 with English translation.
Chinese Office Action issued on Oct. 28, 2014 in Patent Application No. 201310296661.9 with English translation.
Office Action issued on Jan. 6, 2015 in Japanese Patent Application No. 2009-272413 (with English language translation).
Office Action issued on Jan. 6, 2015 in Japanese Patent Application No. 2009-272414 (with English language translation).
Office Action issued on Jan. 6, 2015 in Japanese Patent Application No. 2009-272415 (with English language translation).
Information Offer Form issued in the corresponding Japanese Patent Application No. 2010-274593 w/English translation.

* cited by examiner

POLYCARBONATE RESINS AND PROCESSES FOR PRODUCING THE SAME

TECHNICAL FIELD

The present invention relates to polycarbonate resins having excellent light resistance, transparency, hue, heat resistance, thermal stability, and mechanical strength and to processes for efficiently and stably producing the polycarbonate resins which stably show these performances.

BACKGROUND ART

Polycarbonate resins are generally produced using bisphenols as a monomer ingredient, and are being extensively utilized as so-called engineering plastics in the fields of electrical/electronic parts, automotive parts, medical parts, building materials, films, sheets, bottles, optical recording media, lenses, etc. so as to take advantage of the superiority thereof such as transparency, heat resistance, and mechanical strength.

However, the conventional polycarbonate resins deteriorate in hue, transparency, and mechanical strength when used over a long period in places where the resins are exposed to ultraviolet rays or visible light. There hence have been limitations on outdoor use thereof and on use thereof in the vicinity of illuminators.

Techniques in which a benzophenone-based ultraviolet absorber, benzotriazole-based ultraviolet absorber, or benzoxazine-based ultraviolet absorber is added to a polycarbonate resin in order to overcome such problems are widely known (see, for example, non-patent document 1).

However, addition of such an ultraviolet absorber poses the following problems although the addition brings about improvements in hue retention through ultraviolet irradiation, etc. Namely, there have been problems, for example, that the addition of the ultraviolet absorber deteriorates the hue, heat resistance, and transparency which are inherent in the resin and that the ultraviolet absorber volatilizes during molding to foul the mold.

The bisphenol compounds for use in producing conventional polycarbonate resins have a benzene ring structure and hence show high absorption of ultraviolet rays.

This leads to a deterioration in the light resistance of the polycarbonate resins. Consequently, use of monomer units derived from an aliphatic dihydroxy compound or alicyclic dihydroxy compound which has no benzene ring structure in the molecular framework or from a cyclic dihydroxy compound having an ether bond in the molecule, such as isosorbide, is expected to theoretically improve light resistance. In particular, polycarbonate resins produced using, as a monomer, isosorbide obtained from biomass resources have excellent heat resistance and mechanical strength, and many investigations thereon hence have come to be made in recent years (see, for example, patent documents 1 to 6).

However, since the aliphatic dihydroxy compound or alicyclic dihydroxy compound and the cyclic dihydroxy compound having an ether bond in the molecule, such as isosorbide, have no phenolic hydroxyl group, it is difficult to polymerize these compounds by the interfacial process which is widely known as a process for polycarbonate resin production using bisphenol A as a starting material. Usually, polycarbonate resins are produced from those compounds by the process which is called a transesterification process or a melt process. In this process, the dihydroxy compound and a carbonic diester, e.g., diphenyl carbonate, are subjected to transesterification at a high temperature of 200° C. or above in the presence of a basic catalyst, and the by-product, e.g., phenol, is removed from the system to allow the polymerization to proceed, thereby obtaining a polycarbonate resin. However, the polycarbonate resins obtained using monomers having no phenolic hydroxyl group, such as those shown above, have poor thermal stability as compared with polycarbonate resins obtained using monomers having phenolic hydroxyl groups, e.g., bisphenol A, and hence have had the following problem. The polycarbonate resins take a color during the polymerization or molding in which the resins are exposed to high temperatures and, as a result, the polycarbonate resins come to absorb ultraviolet rays and visible light and hence have impaired light resistance. Especially when a monomer having an ether bond in the molecule, such as isosorbide, was used, the polycarbonate resin considerably deteriorates in hue. A significant improvement has been desired.

Meanwhile, as stated above, polycarbonate resins are extensively utilized as so-called engineering plastics in the fields of electrical/electronic parts and automotive parts and in optical fields such as optical recording media, lenses, etc. However, for use as optical compensation films for flat panel displays, which are rapidly spreading recently, the films have come to be required to have higher optical properties including low birefringence and a low photoelastic coefficient. The existing aromatic polycarbonates have come to be unable to meet the requirement.

Conventional polycarbonates are produced from starting materials derived from petroleum resources. In recent years, however, there is a fear about depletion of petroleum resources, and there is a need for a polycarbonate produced using a starting material obtained from biomass resources including plants. In addition, there is a fear that the global warming caused by increases in carbon dioxide emission and by carbon dioxide accumulation may bring about climate changes and the like. Also from this standpoint, there is a desire for development of a polycarbonate which is produced from a plant-derived monomer and which is carbon-neutral even when discarded after use.

Under these circumstances, a process has been proposed in which a special dihydroxy compound is subjected as a monomer ingredient to transesterification with a carbonic diester to obtain a polycarbonate while removing the by-product monohydroxy compound by distillation under vacuum, as described in patent documents 1 to 6.

However, such a dihydroxy compound having a special structure has a lower boiling point than bisphenols and hence volatilizes considerably during the transesterification reaction, which is conducted at a high temperature and a reduced pressure. The volatilization thereof results not only in a decrease in material unit but also in a problem that it is difficult to regulate the concentration of end groups, which affects quality, to a given value. Furthermore, there has been a problem that when a plurality of dihydroxy compounds are used, the molar proportions of the dihydroxy compounds used change during the polymerization, making it impossible to obtain a polycarbonate resin having a desired molecular weight and a desired composition.

Expedients which may be usable for overcoming those problems include to lower the polymerization temperature and to lessen the degree of vacuum. However, use of these expedients poses a dilemma that monomer volatilization is inhibited but a decrease in productivity results.

A technique in which a polymerization reactor having a specific reflux condenser is used has also been proposed (see, for example, patent document 7). However, the improvement in material unit is still on an unsatisfactory level, and a further improvement is desired.

In addition, the by-product monohydroxy compound, when removed by distillation, deprives the system of a large amount of latent heat of vaporization. Consequently, for maintaining a given polymerization temperature, it is necessary to heat the system with a heating medium (heat medium). In a larger-scale apparatus, however, the heat-transfer surface within the reactor has a reduced area per unit amount of the liquid reaction mixture and, hence, it becomes necessary to heat the reactor with a heat medium having a higher temperature. This means that the part of the liquid reaction mixture which is in contact with the surface of the wall through which the heat medium flows is heated at a higher temperature. Namely, not only volatilization of the low-boiling dihydroxy compound which is in contact with the wall surface is considerably accelerated, but also there is a problem that the heating causes thermal deterioration in the vicinity of the wall surface, resulting in a quality deterioration. This problem becomes more serious as the scale increases.

PRIOR-ART DOCUMENTS

Patent Documents

Patent Document 1: International Publication No. 04/111106
Patent Document 2: JP-A-2006-232897
Patent Document 3: JP-A-2006-28441
Patent Document 4: JP-A-2008-24919
Patent Document 5: JP-A-2009-91404
Patent Document 6: JP-A-2009-91417
Patent Document 7: JP-A-2008-56844

Non-Patent Document

Non-Patent Document 1: HONMA Seiichi, ed., *Porikabonēto Jushi Handobukku*, The Nikkan Kogyo Shinbun, Ltd., Aug. 28, 1992.

SUMMARY OF THE INVENTION

Problems that the Invention is to Solve

An object of the invention is to eliminate the problems of prior-art techniques described above and to provide a polycarbonate resin having excellent light resistance, transparency, hue, heat resistance, thermal stability, and mechanical strength.

Another object of the invention is to eliminate the problems of prior-art techniques and to provide a process for efficiently and stably producing a polycarbonate resin which has excellent light resistance, transparency, hue, heat resistance, thermal stability, and mechanical strength and has performance stability.

Means for Solving the Problems

The present inventors diligently made investigations in order to overcome those problems. As a result, the inventors have found that a polycarbonate resin which has the structure represented by the following general formula (1) in the molecule and which has a transmittance, as measured at a specific wavelength, of a specific value or higher not only has excellent light resistance but also has excellent transparency, hue, heat resistance, thermal stability, and mechanical strength. A first aspect of the invention has been thus achieved.

The first aspect of the invention resides in the following [1] to [16].

[1] A polycarbonate resin which at least contains structural units derived from a dihydroxy compound having the portion represented by the following general formula (1) as part of the structure thereof, the polycarbonate resin giving a molded object (thickness, 3 mm) which has a light transmittance, as measured at a wavelength of 350 nm, of 60% or higher.

[Chem. 1]

(1)

(The case where the portion represented by general formula (1) is part of —CH$_2$—O—H is excluded.)

[2] The polycarbonate resin according to [1] above wherein the molded object (thickness, 3 mm) formed from the polycarbonate resin has a light transmittance, as measured at a wavelength of 320 nm, of 30% or higher.

[3] The polycarbonate resin according to [1] or [2] above wherein the molded object (thickness, 3 mm) formed from the polycarbonate resin has a yellowness index (YI) value, as measured with respect to transmitted light in accordance with ASTM D1925-70, of 12 or less after having been irradiated with light for 100 hours using a metal halide lamp in an environment of 63° C. and a relative humidity of 50% at an irradiance for the wavelength range of 300-400 nm of 1.5 kW/m$^2$.

[4] The polycarbonate resin according to any one of [1] to [3] above wherein the molded object (thickness, 3 mm) formed from the polycarbonate resin has an initial yellowness index value of 10 or less.

[5] The polycarbonate resin according to any one of [1] to [4] above wherein the difference between the initial yellowness index value of the molded object (thickness, 3 mm) formed from the polycarbonate resin and the yellowness index (YI) value thereof measured with respect to transmitted light in accordance with ASTM D1925-70 after the molded object has been irradiated with light for 100 hours using a metal halide lamp in an environment of 63° C. and a relative humidity of 50% at an irradiance for the wavelength range of 300-400 nm of 1.5 kW/m$^2$ is 6 or less in terms of absolute value.

[6] The polycarbonate resin according to any one of [1] to [5] above wherein the molded object (thickness, 3 mm) formed from the polycarbonate resin has an L* value of 96.3 or higher.

[7] The polycarbonate resin according to any one of [1] to [6] above which contains a carbonic diester represented by the following general formula (2) in an amount of 60 weight ppm or less.

[Chem. 2]

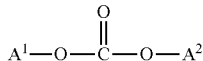
(2)

(In general formula (2), A$^1$ and A$^2$ each independently are a substituted or unsubstituted aliphatic group having 1-18 carbon atoms or a substituted or unsubstituted aromatic group.)

[8] The polycarbonate resin according to any one of [1] to [7] above which contains an aromatic monohydroxy compound in an amount of 700 weight ppm or less.

[9] The polycarbonate resin according to any one of [1] to [8] above which has a total content of sodium, potassium, and cesium of 1 weight ppm or less in terms of metal amount.

[10] The polycarbonate resin according to any one of [1] to [9] above wherein the concentration of the end group represented by the following general formula (3) in the polycarbonate resin is 20-160 µeq/g.

[Chem. 3]

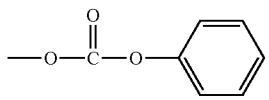
(3)

[11] The polycarbonate resin according to any one of [1] to [10] above which satisfies A/(A+B)≤0.1, wherein A is the number of moles of the H bonded to the aromatic rings contained in the polycarbonate resin and B is the number of moles of the H bonded to the part other than the aromatic rings.

[12] The polycarbonate resin according to any one of [1] to [11] above wherein the dihydroxy compound having the portion represented by general formula (1) as part of the structure thereof is a dihydroxy compound represented by the following general formula (4).

[Chem. 4]

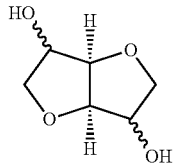
(4)

[13] The polycarbonate resin according to any one of [1] to [12] above which further contains structural units derived from at least one compound selected from the group consisting of aliphatic dihydroxy compounds and alicyclic dihydroxy compounds.

[14] The polycarbonate resin according to any one of [1] to [13] above which is obtained by condensation-polymerizing a dihydroxy compound having the portion represented by general formula (1) as part of the structure thereof with a carbonic diester represented by the following general formula (2) in the presence of a catalyst.

[Chem. 5]

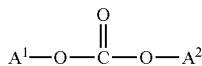
(2)

(In general formula (2), $A^1$ and $A^2$ each independently are a substituted or unsubstituted aliphatic group having 1-18 carbon atoms or a substituted or unsubstituted aromatic group.)

[15] The polycarbonate resin according to [14] above wherein the catalyst comprises one or more compounds of at least one metal selected from the group consisting of lithium and the Group-2 metals of the long-form periodic table, and the total amount of these compounds is 20 µmol or less in terms of metal amount per mole of the dihydroxy compound used.

[16] The polycarbonate resin according to any one of [1] to [14] above which has been obtained using as a catalyst at least one metal compound selected from the group consisting of magnesium compounds and calcium compounds, the polycarbonate resin having a total content of lithium, sodium, potassium, and cesium of 1 weight ppm or less in terms of metal amount.

The inventors diligently made further investigations. As a result, the inventors have found that a polycarbonate resin which has the structure represented by the following general formula (1) in the molecule and which has a transmittance, as measured at a specific wavelength, of a specific value or higher not only has excellent light resistance but also has excellent transparency, hue, heat resistance, thermal stability, and mechanical strength. A second aspect of the invention has been thus achieved.

The second aspect of the invention resides in the following [17] to [20].

[17] A polycarbonate resin which at least contains structural units derived from a dihydroxy compound having the portion represented by the following general formula (1) as part of the structure thereof, the polycarbonate resin giving a molded object (thickness, 3 mm) which has a yellowness index (YI) value, as measured with respect to transmitted light in accordance with ASTM D1925-70, of 12 or less after having been irradiated with light for 100 hours using a metal halide lamp in an environment of 63° C. and a relative humidity of 50% at an irradiance for the wavelength range of 300-400 nm of 1.5 kW/m².

[Chem. 6]

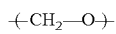
(1)

(The case where the portion represented by general formula (1) is part of —CH$_2$—O—H is excluded.)

[18] The polycarbonate resin according to [17] above wherein the molded object (thickness, 3 mm) formed from the polycarbonate resin has an initial yellowness index value of 10 or less.

[19] The polycarbonate resin according to [17] or [18] above wherein the difference between the initial yellowness index value of the molded object (thickness, 3 mm) formed from the polycarbonate resin and the yellowness index (YI) value thereof measured with respect to transmitted light in accordance with ASTM D1925-70 after the molded object has been irradiated with light for 100 hours using a metal halide lamp in an environment of 63° C. and a relative humidity of 50% at an irradiance for the wavelength range of 300-400 nm of 1.5 kW/m² is 6 or less in terms of absolute value.

[20] The polycarbonate resin according to any one of [17] to [19] above wherein the molded object (thickness, 3 mm) formed from the polycarbonate resin has a light transmittance, as measured at a wavelength of 350 nm, of 60% or higher.

The inventors diligently made still further investigations. As a result, the inventors have found that a polycarbonate resin which has been obtained by condensation-polymerizing at least one dihydroxy compound including a dihydroxy compound that has the portion represented by the following general formula (1) as part of the structure thereof with a carbonic diester represented by the following general formula (2) in the presence of a catalyst comprising one or more compounds containing at least one metal selected from the group consisting of lithium and the Group-2 metals of the long-form periodic table, and in which the content of the metal-containing compounds is 20 µmol or less in terms of metal amount per mole of the dihydroxy compound and the content of an aromatic monohydroxy compound is 700 weight ppm or less not only has excellent light resistance but also has excellent transparency, hue, heat resistance, thermal stability, and mechanical strength. A third aspect of the invention has been thus achieved.

The third aspect of the invention resides in the following [21] to [34].

[21] A polycarbonate resin obtained by condensation-polymerizing at least one dihydroxy compound including a dihydroxy compound which has the portion represented by the following general formula (1) as part of the structure thereof with a carbonic diester represented by the following general formula (2) in the presence of a catalyst, the catalyst comprising one or more compounds containing at least one metal selected from the group consisting of lithium and the Group-2 metals of the long-form periodic table, the polycarbonate resin having a content of the metal-containing compounds of 20 μmol or less in terms of metal amount per mole of the dihydroxy compound and containing an aromatic monohydroxy compound in an amount of 700 weight ppm or less.

[Chem. 7]

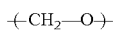
(1)

(The case where the portion represented by general formula (1) is part of —CH$_2$—O—H is excluded.)

[Chem. 8]

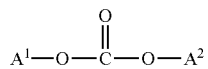
(2)

(In general formula (2), A$^1$ and A$^2$ each independently are a substituted or unsubstituted aliphatic group having 1-18 carbon atoms or a substituted or unsubstituted aromatic group.)

[22] The polycarbonate resin according to [21] above wherein the catalyst comprises at least one metal compound selected from the group consisting of magnesium compounds and calcium compounds.

[23] The polycarbonate resin according to [21] or [22] above which has a total content of sodium, potassium, and cesium of 1 weight ppm or less in terms of metal amount.

[24] The polycarbonate resin according to any one of [21] to [23] above which has a total content of lithium, sodium, potassium, and cesium of 1 weight ppm or less in terms of metal amount.

[25] The polycarbonate resin according to any one of [21] to [24] above which contains the carbonic diester represented by general formula (2) in an amount of 60 weight ppm or less.

[26] The polycarbonate resin according to any one of [21] to [25] above wherein the dihydroxy compound having the portion represented by general formula (1) as part of the structure thereof is a compound represented by the following general formula (4).

[Chem. 9]

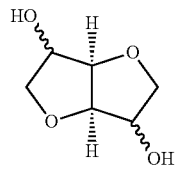
(4)

[27] The polycarbonate resin according to any one of [21] to [26] above which contains structural units derived from the dihydroxy compound that has the portion represented by general formula (1) as part of the structure thereof and further contains structural units derived from at least one compound selected from the group consisting of aliphatic dihydroxy compounds and alicyclic dihydroxy compounds.

[28] The polycarbonate resin according to any one of [21] to [27] above wherein the concentration of the end group represented by the following general formula (3) in the polycarbonate resin is 20-160 μeq/g.

[Chem. 10]

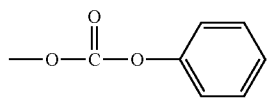
(3)

[29] The polycarbonate resin according to any one of [21] to [28] above which satisfies A/(A+B)≤0.1, wherein A is the number of moles of the H bonded to the aromatic rings contained in the polycarbonate resin and B is the number of moles of the H bonded to the part other than the aromatic rings.

[30] The polycarbonate resin according to any one of [21] to [29] above wherein a molded object (thickness, 3 mm) formed from the polycarbonate resin has a light transmittance, as measured at a wavelength of 350 nm, of 60% or higher.

[31] The polycarbonate resin according to any one of [21] to [30] above wherein a molded object (thickness, 3 mm) formed from the polycarbonate resin has a light transmittance, as measured at a wavelength of 320 nm, of 30% or higher.

[32] The polycarbonate resin according to any one of [21] to [31] above wherein a molded object (thickness, 3 mm) formed from the polycarbonate resin has a yellowness index (YI) value, as measured with respect to transmitted light in accordance with ASTM D1925-70, of 12 or less after having been irradiated with light for 100 hours using a metal halide lamp in an environment of 63° C. and a relative humidity of 50% at an irradiance for the wavelength range of 300-400 nm of 1.5 kW/m$^2$.

[33] The polycarbonate resin according to any one of [21] to [32] above wherein a molded object (thickness, 3 mm) formed from the polycarbonate resin has an initial yellowness index value of 10 or less.

[34] The polycarbonate resin according to any one of [21] to [33] above wherein the difference between the initial yellowness index value of a molded object (thickness, 3 mm) formed from the polycarbonate resin and the yellowness index (YI) value thereof measured with respect to transmitted light in accordance with ASTM D1925-70 after the molded object has been irradiated with light for 100 hours using a metal halide lamp in an environment of 63° C. and a relative humidity of 50% at an irradiance for the wavelength range of 300-400 nm of 1.5 kW/m$^2$ is 6 or less in terms of absolute value.

From the standpoint of eliminating the problems described above, it is preferred that the invention should provide the molded articles shown below under [35] and [36].

[35] A molded polycarbonate resin obtained by molding the polycarbonate resin according to any one of [1] to [34] above.

[36] The molded polycarbonate resin according to [35] above which is a molded article obtained by injection molding.

The inventors diligently made still further investigations. As a result, the inventors have found out a process for producing a polycarbonate resin having excellent light resistance, transparency, hue, heat resistance, thermal stability, and mechanical strength and having stability of these performances, the process being a process in which a carbonic diester and a dihydroxy compound are used as monomers and condensation-polymerized by a transesterification method to produce a polycarbonate resin while regulating the amount of the monomers which are distilled off from the reactors to an amount not larger than a specific value. A fourth aspect of the invention has been thus achieved.

The fourth aspect of the invention resides in the following [37] to [53].

[37] A process for producing a polycarbonate resin using a carbonic diester and at least one dihydroxy compound as starting-material monomers and a catalyst, by condensation-polymerizing the starting-material monomers by means of a transesterification reaction using a plurality of reactors in multiple stages, wherein the dihydroxy compound comprises a dihydroxy compound having the portion represented by the following general formula (1) as part of the structure thereof, at least one of the reactors from which the monohydroxy compound generated as a by-product of the transesterification reaction is distilled off in an amount at least 20% of a theoretical distillation removal amount is a reactor which has a capacity of 20 L or more and which is equipped with a heating means for heating the reactor by means of a heating medium and further equipped with a reflux condenser, the difference between the temperature of the heating medium and the temperature of the liquid reaction mixture present in the reactor being 5° C. or more, and the total amount of the monomers which are distilled off in all reaction stages is up to 10% by weight of the sum of the starting-material monomers.

[Chem. 11]

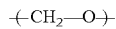  (1)

(The case where the portion represented by general formula (1) is part of —CH$_2$—O—H is excluded.)

[38] A process for producing a polycarbonate resin using a carbonic diester and at least one dihydroxy compound as starting-material monomers and a catalyst, by condensation-polymerizing the starting-material monomers by means of a transesterification reaction using a plurality of reactors in multiple stages, wherein the dihydroxy compound comprises a plurality of dihydroxy compounds, at least one of which is a dihydroxy compound having the portion represented by the following general formula (1) as part of the structure thereof, at least one of the reactors from which the monohydroxy compound generated as a by-product of the transesterification reaction is distilled off in an amount at least 20% of a theoretical distillation removal amount is a reactor which has a capacity of 20 L or more and which is equipped with a heating means for heating the reactor by means of a heating medium and further equipped with a reflux condenser, the difference between the temperature of the heating medium and the temperature of the liquid reaction mixture present in the reactor being 5° C. or more, and the value obtained by dividing the difference between the molar proportion in percentage of each dihydroxy compound which is being fed as a starting material to the reactors and the molar proportion in percentage of structural units of the dihydroxy compound which are contained in the resultant polycarbonate resin by the molar proportion in percentage of the dihydroxy compound which is being fed is 0.03 or less in terms of absolute value with respect to at least one dihydroxy compound and is not larger than 0.05 in terms of absolute value with respect to each of all dihydroxy compounds.

[Chem. 12]

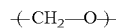  (1)

(The case where the portion represented by general formula (1) is part of —CH$_2$—O—H is excluded.)

[39] The process for producing a polycarbonate resin according to [37] or [38] above wherein the dihydroxy compound comprises at least one dihydroxy compound which has a boiling point at atmospheric pressure of 300° C. or lower.

[40] The process for producing a polycarbonate resin according to any one of [37] to [39] above wherein at least three reactors are used.

[41] The process for producing a polycarbonate resin according to any one of [37] to [40] above wherein a coolant is introduced into the reflux condenser, the coolant having a temperature of 45-180° C. as measured at the inlet of the reflex condenser.

[42] The process for producing a polycarbonate resin according to any one of [37] to [41] above wherein the total amount of monomers which are distilled off in all reaction stages is 3% by weight or less based on the sum of the starting-material monomers.

[43] The process for producing a polycarbonate resin according to any one of [37] to [42] above wherein one or more compounds of at least one metal selected from the group consisting of lithium and the Group-2 metals of the long-form periodic table are supplied as the catalyst to the first reactor from which the monohydroxy compound generated as a by-product of the transesterification reaction is distilled off in an amount of at least 20% of a theoretical distillation removal amount, the metal compounds being used in an amount of 20 μmol or less in terms of the total amount of the metal atoms thereof per mole of all dihydroxy compounds used as starting materials.

[44] The process for producing a polycarbonate resin according to [43] above wherein the catalyst comprises at least one metal compound selected from the group consisting of magnesium compounds and calcium compounds.

[45] The process for producing a polycarbonate resin according to any one of [37] to [44] above wherein the liquid reaction mixture in all reaction stages has a maximum temperature lower than 250° C.

[46] The process for producing a polycarbonate resin according to any one of [37] to [45] above wherein the heating medium has a maximum temperature lower than 265° C.

[47] The process for producing a polycarbonate resin according to any one of [37] to [46] above wherein the dihydroxy compound comprises a compound of the following general formula (4) and at least one compound selected from the group consisting of aliphatic dihydroxy compounds and alicyclic dihydroxy compounds.

[Chem. 13]

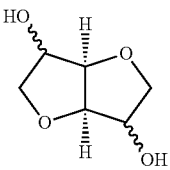  (4)

[48] A polycarbonate resin obtained by the process according to any one of [37] to [47] above, the polycarbonate resin giving a molded object (thickness, 3 mm) which has a light transmittance, as measured at a wavelength of 350 nm, of 60% or higher.

[49] A polycarbonate resin obtained by the process according to any one of [37] to [47] above, the polycarbonate resin giving a molded object (thickness, 3 mm) which has a light transmittance, as measured at a wavelength of 320 nm, of 30% or higher.

[50] A polycarbonate resin obtained by the process according to any one of [37] to [47] above, the polycarbonate resin giving a molded object (thickness, 3 mm) which has a yellowness index (YI) value, as measured with respect to transmitted light in accordance with ASTM D1925-70, of 12 or less after having been irradiated with light for 100 hours using a metal halide lamp in an environment of 63° C. and a relative humidity of 50% at an irradiance for the wavelength range of 300-400 nm of 1.5 kW/m$^2$.

[51] A polycarbonate resin obtained by the process according to any one of [37] to [47] above, the polycarbonate resin giving a molded object (thickness, 3 mm) which has an initial yellowness index value of 10 or less.

[52] A polycarbonate resin obtained by the process according to any one of [37] to [47] above wherein the difference between the initial yellowness index value of a molded object (thickness, 3 mm) formed from the polycarbonate resin and the yellowness index (YI) value thereof measured with respect to transmitted light in accordance with ASTM D1925-70 after the molded object has been irradiated with light for 100 hours using a metal halide lamp in an environment of 63° C. and a relative humidity of 50% at an irradiance for the wavelength range of 300-400 nm of 1.5 kW/m$^2$ is 6 or less in terms of absolute value.

[53] A polycarbonate resin obtained by the process according to any one of [37] to [47] above, the polycarbonate resin giving a molded object (thickness, 3 mm) which has an L* value of 96.3 or higher.

Effects of the Invention

According to the invention, polycarbonate resins which not only have excellent light resistance but also have excellent transparency, hue, heat resistance, thermal stability, moldability, and mechanical strength can be provided. Consequently, the invention can provide polycarbonate resins which are applicable to a wide range of fields including the field of injection molding, such as electrical/electronic parts and automotive parts, the field of films and sheets, the field of bottles and containers, lens applications such as camera lenses, finder lenses, and lenses for CCDs or CMOSs, films or sheets such as retardation films, diffusing sheets, and polarizing films which are utilized in liquid-crystal or plasma displays and the like, optical disks, optical materials, optical parts, and binders for fixing colorants, charge transfer agents, etc. In particular, it is possible to provide polycarbonate resins suitable for use in applications in which the resins are exposed to light including ultraviolet rays, such as outdoor or lighting parts.

Furthermore, according to the invention, it is possible to efficiently and stably produce the polycarbonate resins.

MODES FOR CARRYING OUT THE INVENTION

Modes for carrying out the invention will be explained below in detail. The following explanations on constituent elements are for embodiments (representative embodiments) of the invention, and the invention should not be construed as being limited to the embodiments unless the invention departs from the spirit thereof.

First Polycarbonate Resin

The first polycarbonate resin of the invention is a polycarbonate resin which at least contains structural units derived from a dihydroxy compound having the portion represented by the following general formula (1) as part of the structure thereof, and is characterized by giving a molded object (thickness, 3 mm) which has a light transmittance, as measured at a wavelength of 350 nm, of 60% or higher. The light transmittance thereof at that wavelength is preferably 65% or higher, especially preferably 70% or higher. When the light transmittance thereof at that wavelength is less than 60%, there are the cases where this resin shows enhanced absorption and has impaired light resistance.

[Chem. 14]

(1)

(The case where the portion represented by general formula (1) is part of —CH$_2$—O—H is excluded.)

This is based on the finding that even when resins show no absorption of visible light and appear to have no color when viewed through the human eyes, some of the resins take a color upon exposure to sunlight, artificial lighting, or the like and others do not, and also on the finding that this problem can unexpectedly be overcome by regulating the transmittance of light having a specific wavelength to a given value or higher.

It is preferred that the first polycarbonate resin of the invention should be one in which the molded object (flat plate having a thickness of 3 mm) formed from the resin has a light transmittance, as measured at a wavelength of 320 nm, of 30% or higher. This light transmittance of the molded object is more preferably 40% or higher, especially preferably 50% or higher. When the light transmittance thereof at that wavelength is lower than 30%, there are the cases where the resin has impaired light resistance.

It is preferred that the first polycarbonate resin of the invention should be one in which the molded object (flat plate having a thickness of 3 mm) formed from the polycarbonate resin has a yellowness index (YI) value, as measured with respect to transmitted light in accordance with ASTM D1925-70, of 12 or less after having been irradiated with light for 100 hours using a metal halide lamp in an environment of 63° C. and a relative humidity of 50% at an irradiance for the wavelength range of 300-400 nm of 1.5 kW/m$^2$. The yellowness index value thereof is more preferably 10 or less, especially preferably 8 or less. When the yellowness index (YI) value thereof exceeds 12, there are the cases where the resin, even when colorless immediately after molding, takes a color upon exposure to light including ultraviolet light.

The irradiation using a metal halide lamp in the invention is an operation in which light mainly having wavelengths of 300-400 nm (light having wavelengths outside that wavelength range has been removed as much as possible) is irradiated upon the sample for 100 hours at an irradiance of 1.5 kW/m$^2$ by means of a specific apparatus using a specific filter or the like, as will be described later.

It is preferred that the first polycarbonate resin of the invention should be one which, when molded into a flat plate having a thickness of 3 mm and examined, without being subjected to the irradiation using a metal halide lamp as described above or the like, has a yellowness index value (i.e., initial yellowness index value; referred to as initial YI value) as measured with respect to transmitted light of generally 10 or less.

The initial YI value thereof is more preferably 7 or less, especially preferably 5 or less.

The difference in yellowness index value between before and after the metal halide lamp irradiation is preferably 6 or less, more preferably 4 or less, especially preferably 3 or less, in terms of absolute value.

When the initial yellowness index (YI) value thereof exceeds 10, there are the cases where this resin has impaired light resistance. In the case where the absolute value of the difference in yellowness index (YI) value between before and after the metal halide lamp irradiation exceeds 6, there is a possibility that the resin might take a color when exposed to sunlight, artificial lighting, or the like over a long period to become unusable in applications where transparency is especially required and in other applications.

Furthermore, it is preferred that the first polycarbonate resin of the invention should be one which, when molded into a flat plate having a thickness of 3 mm and examined, has an L* value, as provided for by International Illumination Commission (CIE) and measured with respect to transmitted light, of generally 96.3 or higher. The L* value thereof is more preferably 96.6 or higher, especially preferably 96.8 or higher.

When the L* value thereof is less than 96.3, there are the cases where the resin has impaired light resistance.

Second Polycarbonate Resin

The second polycarbonate resin of the invention is a polycarbonate resin which at least contains structural units derived from a dihydroxy compound having the portion represented by the following general formula (1) as part of the structure thereof, and is characterized by giving a molded object (thickness, 3 mm) which has a yellowness index (YI) value, as measured with respect to transmitted light in accordance with ASTM D1925-70, of 12 or less after having been irradiated with light for 100 hours using a metal halide lamp in an environment of 63° C. and a relative humidity of 50% at an irradiance for the wavelength range of 300-400 nm of 1.5 kW/m².

The yellowness index (YI) value thereof is preferably 10 or less, especially preferably 8 or less.

[Chem. 15]

(1)

(The case where the portion represented by general formula (1) is part of —CH₂—O—H is excluded.)

This is based on the finding that there are the cases where resins in which the yellowness index (YI) value, as measured in accordance with ASTM D 1925-70 after 100-hour irradiation with light using the metal halide lamp at an irradiance for the wavelength range of 300-400 nm of 1.5 kW/m², is higher than 12 take a color upon exposure to light including ultraviolet light even when colorless immediately after molding, and also on the finding that this problem can unexpectedly be overcome by regulating the heat history which the resins underwent in the transesterification reaction (i.e., polycondensation reaction), the catalyst used, the metal component contained therein, the content of a substance having a specific molecular structure, etc.

It is preferred that the second polycarbonate resin of the invention should be one which, when molded into a flat plate having a thickness of 3 mm and examined, without being subjected to the irradiation using a metal halide lamp as described above or the like, has a yellowness index value (i.e., initial yellowness index value; referred to as initial YI value) as measured with respect to transmitted light of generally 10 or less.

The initial YI value thereof is more preferably 7 or less, especially preferably 5 or less.

The difference in yellowness index value between before and after the metal halide lamp irradiation is preferably 6 or less, more preferably 4 or less, especially preferably 3 or less, in terms of absolute value.

When the initial yellowness index (YI) value thereof exceeds 10, there are the cases where this resin has impaired light resistance. In the case where the absolute value of the difference in yellowness index (YI) value between before and after the metal halide lamp irradiation exceeds 6, there is a possibility that the resin might take a color when exposed to sunlight, artificial lighting, or the like over a long period to become unusable in applications where transparency is especially required and in other applications.

It is preferred that the second polycarbonate resin of the invention should be one in which the molded object (thickness, 3 mm) formed from the resin has a light transmittance, as measured at a wavelength of 350 nm, of 60% or higher. This light transmittance of the molded object is more preferably 65% or higher, especially preferably 70% or higher. When the light transmittance thereof at that wavelength is lower than 60%, there are the cases where this resin shows enhanced absorption and has impaired light resistance.

It is preferred that the second polycarbonate resin of the invention should be one in which the molded object (flat plate having a thickness of 3 mm) formed from the resin has a light transmittance, as measured at a wavelength of 320 nm, of 30% or higher. This light transmittance of the molded object is more preferably 40% or higher, especially preferably 50% or higher. When the light transmittance thereof at that wavelength is lower than 30%, there are the cases where the resin has impaired light resistance.

Furthermore, it is preferred that the second polycarbonate resin of the invention should be one which, when molded into a flat plate having a thickness of 3 mm and examined, has an L* value, as provided for by International Illumination Commission (CIE) and measured with respect to transmitted light, of generally 96.3 or higher. The L* value thereof is more preferably 96.6 or higher, especially preferably 96.8 or higher. When the L* value thereof is less than 96.3, there are the cases where the resin has impaired light resistance.

Third Polycarbonate Resin

The third polycarbonate resin of the invention is a polycarbonate resin obtained by condensation-polymerizing at least one dihydroxy compound including a dihydroxy compound which has the portion represented by the following general formula (1) as part of the structure thereof with a carbonic diester represented by the following general formula (2) in the presence of a catalyst which comprises one or more compounds of at least one metal selected from the group consisting of lithium and the Group-2 metals of the long-form periodic table, the polycarbonate resin having a content of the metal compounds of 20 μmol or less in terms of metal amount per mole of the dihydroxy compound and containing an aromatic monohydroxy compound in an amount of 700 weight ppm or less.

[Chem. 16]

(1)

(The case where the portion represented by general formula (1) is part of —CH₂—O—H is excluded.)

[Chem. 17]

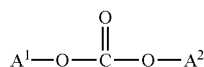
(2)

(In general formula (2), $A^1$ and $A^2$ each independently are a substituted or unsubstituted aliphatic group having 1-18 carbon atoms or a substituted or unsubstituted aromatic group.)

The third polycarbonate resin of the invention is a polycarbonate resin obtained by condensation-polymerizing at least one dihydroxy compound including the specific dihydroxy compound with a carbonic diester in the presence of a specific amount of a specific catalyst. Since the content of an aromatic monohydroxy compound therein has been regulated to a value not larger than a specific amount, this polycarbonate resin has excellent light resistance, transparency, hue, heat resistance, thermal stability, and mechanical strength. Especially with respect to light resistance, absorption in the visible-light region has conventionally received attention. However, the present inventors have found that even when resins show no absorption of visible light and appear to have no color when viewed through the human eyes, some of the resins take a color upon exposure to sunlight, artificial lighting, or the like and others do not. The invention has been thus achieved.

It is preferred that the third polycarbonate resin of the invention should be one which gives a molded object (thickness, 3 mm) that has a light transmittance, as measured at a wavelength of 350 nm, of 60% or higher. This light transmittance of the molded object is more preferably 65% or higher, especially preferably 70% or higher. When the light transmittance thereof at that wavelength is lower than 60%, there are the cases where this resin shows enhanced absorption and has impaired light resistance.

It is preferred that the third polycarbonate resin of the invention should be one which gives a molded object (thickness, 3 mm) that has a light transmittance, as measured at a wavelength of 320 nm, of 30% or higher. This light transmittance of the molded object is more preferably 40% or higher, especially preferably 50% or higher. When the light transmittance thereof at that wavelength is lower than 30%, there are the cases where the resin has impaired light resistance.

It is preferred that the third polycarbonate resin of the invention should be one which gives a molded object (thickness, 3 mm) that has a yellowness index (YI) value, as measured with respect to transmitted light in accordance with ASTM D1925-70, of 12 or less after having been irradiated with light for 100 hours using a metal halide lamp in an environment of 63° C. and a relative humidity of 50% at an irradiance for the wavelength range of 300-400 nm of 1.5 kW/m². The yellowness index value thereof is more preferably 10 or less, especially preferably 8 or less. When the yellowness index (YI) value thereof exceeds 12, there are the cases where the resin, even when colorless immediately after molding, takes a color upon exposure to light including ultraviolet light.

It is preferred that the third polycarbonate resin of the invention should be one which gives a molded object (thickness, 3 mm) that, when examined without being subjected to the irradiation using a metal halide lamp as described above or the like, has a yellowness index value (i.e., initial yellowness index value; referred to as initial YI value) as measured with respect to transmitted light of generally 10 or less. The initial YI value thereof is more preferably 7 or less, especially preferably 5 or less. The difference in yellowness index value between before and after the metal halide lamp irradiation is preferably 6 or less, more preferably 4 or less, especially preferably 3 or less, in terms of absolute value.

When the initial yellowness index (YI) value thereof exceeds 10, there is a tendency that this resin has impaired light resistance. In the case where the absolute value of the difference in yellowness index (YI) value between before and after the metal halide lamp irradiation exceeds 6, there is a possibility that the resin might take a color when exposed to sunlight, artificial lighting, or the like over a long period to become unusable in applications where transparency is especially required and in other applications.

Furthermore, it is preferred that the third polycarbonate resin of the invention should be one which, when examined as a molded object formed therefrom (thickness, 3 mm), has an L* value, as provided for by International Illumination Commission (CIE) and measured with respect to transmitted light, of generally 96.3 or higher. The L* value thereof is more preferably 96.6 or higher, especially preferably 96.8 or higher. When the L* value thereof is less than 96.3, there are the cases where the resin has impaired light resistance.

Any of the first to third polycarbonate resins described above (hereinafter also referred to simply as "polycarbonate resins of the invention") produces the effects of the invention. Such a polycarbonate resin can be produced, for example, by limiting the concentration of specific metals during polymerization, suitably selecting the kind and amount of catalyst, suitably selecting a polymerization temperature and polymerization period, reducing the amount of compounds in the resin which have the ability to absorb ultraviolet rays, e.g., residual phenol and residual diphenyl carbonate, reducing the amount of any starting-material monomer to be used which shows absorption in the ultraviolet region, or reducing the amount of any starting material to be used which contains an impurity that shows absorption in the ultraviolet region. Especially important are the kind of catalyst and amount thereof, polymerization temperature, and polymerization period.

Processes for producing the polycarbonate resins of the invention will be explained below in detail.

<Starting Materials>
(Dihydroxy Compounds)

The polycarbonate resins of the invention at least contain structural units derived from a dihydroxy compound having the portion represented by the following general formula (1) as part of the structure thereof (hereinafter often referred to as "dihydroxy compound according to the invention"). Namely, the dihydroxy compound according to the invention is a dihydroxy compound which at least includes two hydroxyl groups and the structural unit of the following general formula (1).

[Chem. 18]

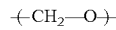
(1)

(The case where the portion represented by general formula (1) is part of —CH₂—O—H is excluded.)

The dihydroxy compound according to the invention is not particularly limited as long as the compound has the portion represented by general formula (1) as part of the structure thereof. Examples thereof include oxyalkylene glycols such as diethylene glycol, triethylene glycol, tetraethylene glycol, and polyethylene glycol, compounds which have an aromatic group as a side chain and have, in the main chain, ether groups each bonded to an aromatic group, such as 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3-isopropylphenyl)fluorene, 9,9-bis(4-(2-hydroxyethoxy)-3- isobutylphenyl)fluorene, 9,9-bis(4-(2-hydroxyethoxy)-3-tert-butylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene, 9,9-bis(4-(2-hydroxyethoxy)-3,5-dimethylphenyl)fluorene, 9,9-bis(4-(2-hydroxyethoxy)-3-tert-butyl-6-methylphenyl)fluorene, and 9,9-bis(4-(3-hydroxy-2,2-dimethylpropoxy)phenyl)fluorene, anhydrous sugar alcohols represented by dihydroxy compounds represented by the following general formula (4), and compounds having a cyclic ether structure, such as the Spiro glycol represented by the following general formula (5). Of these, diethylene glycol and triethylene glycol are preferred from the standpoints of availability, handling, reactivity during polymerization, and the hue of the polycarbonate resin to be obtained. Preferred from the standpoint of heat resistance are anhydrous sugar alcohols represented by dihydroxy compounds represented by the following general formula (4) and the compound having a cyclic ether structure which is represented by the following general formula (5).

These compounds may be used alone or in combination of two or more thereof according to the performances required of the polycarbonate resin to be obtained.

[Chem. 19]

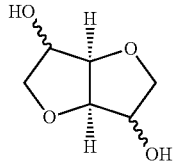

(4)

[Chem. 20]

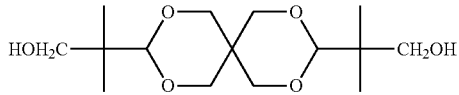

(5)

Examples of the dihydroxy compounds represented by general formula (4) include isosorbide, isomannide, and isoidide, which are stereoisomers. These compounds may be used alone or in combination of two or more thereof.

From the standpoint of the light resistance of the polycarbonate resins of the invention, it is preferred to use dihydroxy compounds having no aromatic ring structure among those dihydroxy compounds. Most preferred of these dihydroxy compounds is isosorbide from the standpoints of availability, ease of production, light resistance, optical properties, moldability, heat resistance, and carbon neutrality. Isosorbide is obtained by the dehydrating condensation of sorbitol, which is produced from various starches that are plant-derived abundant resources and are easily available.

The polycarbonate resins of the invention may contain structural units derived from dihydroxy compounds other than the dihydroxy compound according to the invention (hereinafter often referred to as "other dihydroxy compounds"). Examples of the other dihydroxy compounds include aliphatic dihydroxy compounds such as ethylene glycol, 1,3-propanediol, 1,2-propanediol, 1,4-butanediol, 1,3-butanediol, 1,2-butanediol, 1,5-heptanediol, and 1,6-hexanediol, alicyclic dihydroxy compounds such as 1,2-cyclohexanedimethanol, 1,3-cyclohexanedimethanol, 1,4-cyclohexanedimethanol, tricyclodecanedimethanol, pentacyclopentadecanedimethanol, 2,6-decalindimethanol, 1,5-decalindimethanol, 2,3-decalindimethanol, 2,3-norbornanedimethanol, 2,5-norbornanedimethanol, and 1,3-adamantanedimethanol, and aromatic bisphenol compounds such as 2,2-bis(4-hydroxyphenyl)propane[=bisphenol A], 2,2-bis(4-hydroxy-3,5-dimethylphenyl)propane, 2,2-bis(4-hydroxy-3,5-diethylphenyl)propane, 2,2-bis(4-hydroxy-(3,5-diphenyl)phenyl)propane, 2,2-bis(4-hydroxy-3,5-dibromophenyl)propane, 2,2-bis(4-hydroxyphenyl)pentane, 2,4'-dihydroxydiphenylmethane, bis(4-hydroxyphenyl)methane, bis(4-hydroxy-5-nitrophenyl)methane, 1,1-bis(4-hydroxyphenyl)ethane, 3,3-bis(4-hydroxyphenyl)pentane, 1,1-bis(4-hydroxyphenyl)cyclohexane, bis(4-hydroxyphenyl)sulfone, 2,4'-dihydroxydiphenyl sulfone, bis(4-hydroxyphenyl) sulfide, 4,4'-dihydroxydiphenyl ether, 4,4'-dihydroxy-3,3'-dichlorodiphenyl ether, 9,9-bis(4-(2-hydroxyethoxy-2-methyl)phenyl)fluorene, 9,9-bis(4-hydroxyphenyl)fluorene, and 9,9-bis(4-hydroxy-2-methylphenyl)fluorene.

From the standpoint of the light resistance of the polycarbonate resins, it is preferred to use, among those compounds, at least one compound selected from the group consisting of the dihydroxy compounds having no aromatic ring structure in the molecular structure thereof, i.e., the aliphatic dihydroxy compounds and the alicyclic dihydroxy compounds. Especially preferred of the aliphatic dihydroxy compounds are 1,3-propanediol, 1,4-butanediol, and 1,6-hexanediol. Especially preferred of the alicyclic dihydroxy compounds are 1,4-cyclohexanedimethanol and tricyclodecanedimethanol.

Use of such other dihydroxy compounds makes it possible to obtain effects such as an improvement in the flexibility of the polycarbonate resins, improvement in the heat resistance thereof, improvement in the moldability thereof, etc. However, in the case where the content of structural units derived from other dihydroxy compounds is too high, this may result in a decrease in mechanical property and a decrease in heat resistance. Consequently, it is preferred that the proportion of structural units derived from the dihydroxy compound according to the invention to structural units derived from all dihydroxy compounds should be 20% by mole or higher, preferably 30% by mole or higher, especially 50% by mole or higher.

When at least one of the dihydroxy compounds which are the dihydroxy compound according to the invention and other dihydroxy compounds has a boiling point of 300° C. or lower at atmospheric pressure, this dihydroxy compound is apt to volatilize during the polymerization reaction. The effects of the invention hence are enhanced in this case. When the boiling point thereof is 290° C. or lower, the effects are further enhanced.

The dihydroxy compound according to the invention may contain stabilizers such as a reducing agent, antioxidant, free-oxygen scavenger, light stabilizer, antacid, pH stabilizer, and heat stabilizer. Since the dihydroxy compound according to the invention is apt to alter especially under acidic conditions, it is preferred that the dihydroxy compound should contain a basic stabilizer. Examples of the basic stabilizer include the hydroxides, carbonates, phosphates, phosphites, hypophosphites, borates, and fatty acid salts of Group-1 or Group-2 metals of the long-form periodic table (Nomenclature of Inorganic Chemistry IUPAC Recommendations 2005). Examples thereof further include basic ammonium compounds such as tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, triethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide, and butyltriphenylammonium hydroxide and amine compounds such as 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole, and aminoquinoline. Of these, the phosphates and phosphites of Na or K are preferred from the standpoints of the effect thereof and the ease of removal thereof by distillation which will be described later. Especially preferred are disodium hydrogen phosphate and disodium hydrogen phosphite.

There are no particular limitations on the content of those basic stabilizers in the dihydroxy compound according to the invention. In the case where the content thereof is too low, there is a possibility that the effect of preventing the alteration of the dihydroxy compound according to the invention might not be obtained. When the content thereof is too high, there are the cases where the dihydroxy compound according to the invention is altered. Consequently, the content of those basic stabilizers is generally 0.0001-1% by weight, preferably 0.001-0.1% by weight, based on the dihydroxy compound according to the invention.

When the dihydroxy compound according to the invention which contains those basic stabilizers is used as a starting material for producing a polycarbonate resin, not only the basic stabilizers themselves serve as a polymerization catalyst to make it difficult to control polymerization rate and quality, but also the presence of the basic stabilizers leads to a deterioration in initial hue, resulting in molded articles having impaired light resistance. It is therefore preferred that the basic stabilizers should be removed with an ion-exchange resin or by distillation or the like before the dihydroxy compound according to the invention is used as a starting material for producing a polycarbonate resin.

In the case where the dihydroxy compound according to the invention is a compound having a cyclic ether structure, e.g., isosorbide, this dihydroxy compound is apt to be gradually oxidized by oxygen. It is therefore preferred to handle the compound in an oxygen-free environment during storage or production in order to prevent decomposition caused by oxygen. It is important to use a free-oxygen scavenger or the like or to handle the dihydroxy compound in a nitrogen atmosphere. There are the cases where isosorbide, upon oxidation, generates decomposition products including formic acid. Since there is a possibility that the presence of water might accelerate generation of isosorbide decomposition products, it is also important to prevent water inclusion during storage. For example, in the case where isosorbide containing those decomposition products is used as a starting material for producing a polycarbonate resin, there is the possibility of resulting in a colored polycarbonate resin.

There also is a possibility that the decomposition products considerably deteriorate the properties of the resin. In addition, there are the cases where the decomposition products affect the polymerization reaction to make it impossible to obtain a polymer having a high molecular weight. Use of such isosorbide hence is undesirable.

It is preferred to conduct purification by distillation in order to obtain the dihydroxy compound according to the invention which does not contain the oxidative-decomposition products and to remove the basic stabilizers described above. The distillation in this case may be simple distillation or continuous distillation, and is not particularly limited. With respect to distillation conditions, it is preferred to conduct distillation at a reduced pressure in an inert gas atmosphere such as argon or nitrogen. From the standpoint of inhibiting thermal alteration, it is preferred to conduct the distillation under the conditions of 250° C. or lower, preferably 200° C. or lower, especially 180° C. or lower.

Through such purification by distillation, the content of formic acid in the dihydroxy compound according to the invention is reduced to 20 weight ppm or less, preferably 10 weight ppm or less, especially preferably 5 weight ppm or less. As a result, when dihydroxy compounds including this dihydroxy compound according to the invention are used as a starting material for producing a polycarbonate resin, polymerizability is not impaired and a polycarbonate resin having an excellent hue and excellent thermal stability can be produced. The content of formic acid is determined by ion chromatography.

(Carbonic Diester)

The polycarbonate resins of the invention can be obtained using at least one dihydroxy compound including the dihydroxy compound according to the invention described above and a carbonic diester as starting materials, by condensation-polymerizing the starting materials by means of a transesterification reaction.

Examples of the carbonic diester to be used usually include compounds represented by the following general formula (2). One of these carbonic diesters may be used alone, or a mixture of two or more thereof may be used.

[Chem. 21]

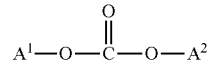

(2)

(In general formula (2), $A^1$ and $A^2$ each independently are a substituted or unsubstituted aliphatic group having 1-18 carbon atoms or a substituted or unsubstituted aromatic group.)

Examples of the carbonic diesters represented by general formula (2) include diphenyl carbonate, substituted diphenyl carbonates, e.g., ditolyl carbonate, dimethyl carbonate, diethyl carbonate, and di-t-butyl carbonate. Preferred are diphenyl carbonate and substituted diphenyl carbonates. Especially preferred is diphenyl carbonate (hereinafter often abbreviated to "DPC"). Incidentally, there are the cases where carbonic diesters contain impurities such as chloride ions and where the impurities inhibit the polymerization reaction and impair the hue of the polycarbonate resin to be obtained. It is therefore preferred that a carbonic diester which has been purified by, for example, distillation should be used according to need.

(Transesterification Reaction Catalyst)

The polycarbonate resins of the invention each are produced by subjecting at least one dihydroxy compound including the dihydroxy compound according to the invention as described above and the carbonic diester to a transesterification reaction. More specifically, the polycarbonate resin is obtained by subjecting the starting materials to transesterification and removing the by-product monohydroxy compound, etc. from the system. In this case, polycondensation is usually conducted by means of a transesterification reaction in the presence of a transesterification reaction catalyst.

The transesterification reaction catalyst (hereinafter often referred to simply as "catalyst" or "polymerization catalyst") can affect light transmittance as measured especially at a wavelength of 350 nm and yellowness index value.

The catalyst to be used is not limited so long as the catalyst enables the polycarbonate resin produced therewith to satisfy, in particular, light resistance among light resistance, transparency, hue, heat resistance, thermal stability, and mechanical strength, that is, the catalyst enables the polycarbonate resin to have a given value of light transmittance as measured at a wavelength of 350 nm and a given yellowness index value. Examples thereof include compounds of metals belonging to the Group 1 or Group 2 of the long-form periodic table (hereinafter referred to simply as "Group 1" or "Group 2") and basic compounds such as basic boron compounds, basic phosphorus compounds, basic ammonium compounds, and amine compounds. It is preferred to use a Group-1 metal compound and/or a Group-2 metal compound.

It is possible to use a basic compound such as a basic boron compound, basic phosphorus compound, basic ammonium compound, or amine compound as an auxiliary together with a Group-1 metal compound and/or a Group-2 metal compound. It is, however, especially preferred to use a Group-1 metal compound and/or a Group-2 metal compound only.

With respect to the form of the Group-1 metal compound and/or Group-2 metal compound, the compound is used usually in the form of a hydroxide or a salt such as carbonate, carboxylate, or phenolate. However, hydroxides, carbonates, and acetates are preferred from the standpoints of availability and handleability, and acetates are preferred from the standpoints of hue and activity in polymerization.

Examples of the Group-1 metal compound include sodium hydroxide, potassium hydroxide, lithium hydroxide, cesium hydroxide, sodium hydrogen carbonate, potassium hydrogen carbonate, lithium hydrogen carbonate, cesium hydrogen carbonate, sodium carbonate, potassium carbonate, lithium carbonate, cesium carbonate, sodium acetate, potassium acetate, lithium acetate, cesium acetate, sodium stearate, potassium stearate, lithium stearate, cesium stearate, sodium boron hydride, potassium boron hydride, lithium boron hydride, cesium boron hydride, phenylated boron-sodium compounds, phenylated boron-potassium compounds, phenylated boron-lithium compounds, phenylated boron-cesium compounds, sodium benzoate, potassium benzoate, lithium benzoate, cesium benzoate, disodium hydrogen phosphate, dipotassium hydrogen phosphate, dilithium hydrogen phosphate, dicesium hydrogen phosphate, disodium phenyl phosphate, dipotassium phenyl phosphate, dilithium phenyl phosphate, dicesium phenyl phosphate, alcoholates or phenolates of sodium, potassium, lithium, and cesium, and the disodium salt, dipotassium salt, dilithium salt, and dicesium salt of bisphenol A. Preferred of these are the lithium compounds.

Examples of the Group-2 metal compound include calcium hydroxide, barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate. Preferred of these are the magnesium compounds, the calcium compounds, and the barium compounds. From the standpoints of activity in polymerization and the hue of the polycarbonate resin to be obtained, at least one metal compound selected from the magnesium compounds and the calcium compounds is more preferred, and the calcium compounds are most preferred.

Examples of the basic boron compounds include the sodium salts, potassium salts, lithium salts, calcium salts, barium salts, magnesium salts, or strontium salts of tetramethylboron, tetraethylboron, tetrapropylboron, tetrabutylboron, trimethylethylboron, trimethylbenzylboron, trimethylphenylboron, triethylmethylboron, triethylbenzylboron, triethylphenylboron, tributylbenzylboron, tributylphenylboron, tetraphenylboron, benzyltriphenylboron, methyltriphenylboron, and butyltriphenylboron.

Examples of the basic phosphorus compounds include triethylphosphine, tri-n-propylphosphine, triisopropylphosphine, tri-n-butylphosphine, triphenylphosphine, tributylphosphine, and quaternary phosphonium salts.

Examples of the basic ammonium compounds include tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, triethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide, and butyltriphenylammonium hydroxide.

Examples of the amine compounds include 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole, and aminoquinoline.

The amount of the polymerization catalyst to be used is usually preferably 0.1-300 µmol, more preferably 0.5-100 µmol, per mole of all dihydroxy compounds subjected to the polymerization. Especially in the case where use is made of one or more compounds containing at least one metal selected from the group consisting of lithium and the Group-2 metals of the long-form periodic table, in particular, in the case where at least one metal compound selected from magnesium compounds and calcium compounds is used, the amount of this catalyst is generally 0.1 µmol or more, preferably 0.5 µmol or more, especially preferably 0.7 µmol or more, in terms of metal amount per mole of all dihydroxy compounds. The suitable upper limit thereof is generally 20 µmol, preferably 10 µmol, more preferably 3 µmol, especially preferably 1.5 µmol, in particular 1.0 µmol.

When the amount of the catalyst is too small, there are the cases where the rate of polymerization is too low. As a result, a higher polymerization temperature must be used in order to obtain a polycarbonate resin having a desired molecular weight, and the polycarbonate resin thus obtained has an impaired hue and impaired light resistance. In addition, there is a possibility that an unreacted starting material might volatilize during the polymerization to change the molar proportions of the at least one dihydroxy compound including the dihydroxy compound according to the invention and of the carbonic diester and a desired molecular weight might hence be not reached. On the other hand, in the case where the polymerization catalyst is used in too large an amount, there is a possibility that the resultant polycarbonate resin might have an impaired hue and impaired light resistance.

There is a possibility that when Group-1 metals, especially sodium, potassium, and cesium, in particular, lithium, sodium, potassium, and cesium, are contained in a polycarbonate resin in a large amount, these metals might adversely affect the hue. These metals do not come only from the catalyst used but may come from starting materials and the reactor. Consequently, the total amount of compounds of those metals in the polycarbonate resin is usually preferably 1 weight ppm or less, more preferably 0.8 weight ppm or less, even more preferably 0.7 weight ppm or less, in terms of metal amount.

The content of metals in a polycarbonate resin can be determined by recovering the metals contained in the polycarbonate resin by a technique such as wet ashing and then determining the amount of the metals using a technique such as atomic emission, atomic absorption, or inductively coupled plasma (ICP) spectroscopy.

In the case where diphenyl carbonate or a substituted diphenyl carbonate, e.g., ditolyl carbonate, is used as a carbonic diester represented by general formula (2) to produce a polycarbonate resin of the invention, phenol or a substituted phenol generates as a by-product and unavoidably remains in the polycarbonate resin. However, since phenol and the substituted phenol also have an aromatic ring, there are the cases where not only these compounds absorb ultraviolet rays to serve as a factor contributing to a deterioration in light resistance but also the compounds are causative of an odor during molding. After an ordinary batch reaction, the polycarbonate resin contains an aromatic monohydroxy compound having an aromatic ring, e.g., by-product phenol, in an amount of 1,000 weight ppm or more. From the standpoints of light resistance and odor diminution, it is preferred to reduce the content of the aromatic monohydroxy compound to preferably 700 weight ppm or less, more preferably 500 weight ppm or less, especially 300 weight ppm or less, using a horizontal reactor having excellent volatilizing performance or using an extruder having a vacuum vent. It is, however, noted that it is difficult to industrially completely remove the aromatic monohydroxy compound, and the lower limit of the content thereof is generally 1 weight ppm.

Those aromatic monohydroxy compounds may, of course, have substituents, depending on the starting materials used. For example, the compounds may have an alkyl group having up to 5 carbon atoms or the like.

When the number of moles of the H bonded to the aromatic rings of each polycarbonate resin of the invention is expressed by A and the number of moles of the H bonded to the part other than the aromatic rings is expressed by B, then the proportion of the number of moles of the H bonded to the aromatic rings to the number of moles of all H is expressed by A/(A+B). Since there is a possibility that the aromatic rings, which have ultraviolet-absorbing ability, might affect light resistance as stated above, it is preferred that A/(A+B) should be 0.1 or less, more preferably 0.05 or less, even more preferably 0.02 or less, especially preferably 0.01 or less. The value of A/(A+B) can be determined by $^1$H NMR spectroscopy.

<First Production Process>

Although the polycarbonate resins of the invention each is obtained by condensation-polymerizing one or more dihydroxy compounds including the dihydroxy compound according to the invention with the carbonic diester by means of a transesterification reaction, it is preferred to evenly mix the starting materials, i.e., the dihydroxy compounds and the carbonic diester, prior to the transesterification reaction.

The temperature at which the starting materials are mixed together is generally 80° C. or higher, preferably 90° C. or higher, and the upper limit thereof is generally 250° C. or lower, preferably 200° C. or lower, more preferably 150° C. or lower. Especially suitable is a temperature of 100-120° C. In the case where the mixing temperature is too low, there is the possibility of resulting in too low a dissolution rate or in insufficient solubility. In addition, there are often the cases where troubles such as solidification arise. When the mixing temperature is too high, there are the cases where the dihydroxy compounds deteriorate thermally. There is hence a possibility that the polycarbonate resin obtained has an impaired hue and this adversely affects light resistance.

It is preferred that an operation for mixing the dihydroxy compounds including the dihydroxy compound according to the invention and the carbonic diester, which are starting materials for a polycarbonate resin of the invention, should be conducted in an atmosphere having an oxygen concentration of 10 vol % or less, typically 0.0001-10 vol %. From the standpoint of preventing hue deterioration, it is preferred to conduct the operation in an atmosphere having an oxygen concentration of, in particular, 0.0001-5 vol %, especially 0.0001-1 vol %.

It is preferred that for obtaining a polycarbonate resin of the invention, the carbonic diester should be used in such an amount that the molar proportion thereof to the dihydroxy compounds to be subjected to the reaction, which include the dihydroxy compound according to the invention, is 0.90-1.20. The molar proportion thereof is more preferably 0.95-1.10.

In the case where the molar proportion thereof is too low, there is a possibility that the polycarbonate resin produced might have an increased amount of terminal hydroxyl groups and this might impair the thermal stability of the polymer and cause the polymer to take a color upon molding. There also is a possibility that the rate of transesterification reaction might decrease or a desired high-molecular polymer might not be obtained.

On the other hand, when the molar proportion thereof is too high, there are the cases where the rate of transesterification reaction decreases or it is difficult to produce a polycarbonate having a desired molecular weight. The decrease in the rate of transesterification reaction enhances heat history during the polymerization reaction, resulting in a possibility that the enhanced heat history might impair the hue and light resistance of the polycarbonate resin obtained.

Furthermore, when the molar proportion of the carbonic diester to the dihydroxy compounds including the dihydroxy compound according to the invention is too high, there are the cases where the polycarbonate resin obtained has an increased content of the residual carbonic diester and the residual carbonic diester absorbs ultraviolet rays to impair the light resistance of the polycarbonate resin. The concentration of the carbonic diester remaining in each polycarbonate resin of the invention is preferably 200 weight ppm or less, more preferably 100 weight ppm or less, even more preferably 60 weight ppm or less, especially preferably 30 weight ppm or less. Actually, some polycarbonate resins contain unreacted carbonic diesters. A lower limit of the concentration thereof is generally 1 weight ppm.

In the invention, a process in which the dihydroxy compounds are condensation-polymerized with the carbonic diester is conducted in the presence of the catalyst described above usually in multiple stages using a plurality of reactors. The mode of reaction operation may be any of the batch type, the continuous type, and a combination of the batch type and the continuous type. It is, however, preferred that the process should be continuous. The reasons for this are, for example, that it is easy to set more preferred reaction conditions for each reaction stage and that it is easy to diminish the unreacted monomers and by-products of the reaction.

It is preferred that in the initial stage of the polymerization, the polymerization should be conducted at a relatively low temperature and under relatively low vacuum to obtain a prepolymer, and that in the late stage of the polymerization, the polymerization should be conducted at a relatively high temperature under relatively high vacuum to heighten the molecular weight to a given value. It is, however, important from the standpoints of hue and light resistance that a jacket temperature, an internal temperature, and an internal pressure of the system should be suitably selected for each molecular-weight stage. For example, in the case where either temperature or pressure is too speedily changed before the polymerization reaction reaches a given value, an unreacted monomer is distilled off to change the molar ratio of the dihydroxy compounds to the carbonic diester. This may result in a decrease in polymerization rate or make it impossible to obtain a polymer having a given molecular weight or having given end groups. There hence is a possibility that the objects of the invention cannot finally be accomplished.

To provide a polymerization reactor with a reflux condenser is effective for inhibiting the monomers from being distilled off. This effect is high especially in the reactor for the initial stage of polymerization, in which the amount of unreacted monomer ingredients is large. The temperature of the coolant which is being introduced into the reflux condenser can be suitably selected according to the monomers used. However, the temperature of the coolant being introduced into the reflux condenser, as measured at the inlet of the reflux condenser, is generally 45-180° C., preferably 80-150° C., especially preferably 100-130° C. In the case where the temperature of the coolant being introduced into the reflux condenser is too high, the amount of the monomers being refluxed decreases, resulting in a decrease in the effect of the refluxing. When the temperature thereof is too low, there are the cases where the efficiency of the removal by distillation of the monohydroxy compound to be removed by distillation decreases. As the coolant, use may be made of hot water, steam, a heat-medium oil, or the like. It is preferred to use steam or a heat-medium oil.

The selection of the kind and amount of a catalyst described above is important for maintaining a suitable polymerization rate and inhibiting the monomers from being distilled off and for simultaneously enabling the finally obtained polycarbonate resin to have intact properties such as hue, thermal stability, and light resistance.

It is preferred that each polycarbonate resin of the invention should be produced by polymerizing the starting materials in multiple stages using a catalyst and a plurality of reactors. The reasons why the polymerization is conducted in a plurality of reactors are that in the initial stage of the polymerization reaction, since the monomers are contained in a large amount in the liquid reaction mixture, it is important that the monomers should be inhibited from volatilizing off while maintaining a necessary polymerization rate, and that in the late stage of the polymerization reaction, it is important to sufficiently remove by distillation the by-product monohydroxy compound in order to shift the equilibrium to the polymerization side. For thus setting different sets of polymerization reaction conditions, it is preferred to use a plurality of polymerization reactors arranged serially, from the standpoint of production efficiency.

The number of reactors to be used in the process of the invention is not limited so long as the number thereof is at least 2 as described above. From the standpoints of production efficiency, etc., the number thereof is 3 or more, preferably 3-5, especially preferably 4.

In the invention, the process may be conducted in various manners so long as two or more reactors are used. For example, a plurality of reaction stages differing in conditions are formed in any of the reactors, or the temperature and the pressure may be continuously changed in any of the reactors.

In the invention, the polymerization catalyst can be introduced into a starting-material preparation tank or a starting-material storage tank, or can be introduced directly into a polymerization vessel. However, from the standpoints of stability of feeding and polymerization control, a catalyst supply line is disposed somewhere in a starting-material line before a polymerization vessel, and the catalyst is supplied preferably in the form of an aqueous solution.

With respect to polymerization reaction temperature, too low temperatures result in a decrease in productivity and cause the product to undergo an enhanced heat history. Too high temperatures not only result in monomer volatilization but also result in the possibility of enhancing degradation and coloring of the polycarbonate resin.

Specifically, the reaction in the first stage may be conducted at a temperature of 140-270° C., preferably 180-240° C., more preferably 200-230° C., in terms of the maximum internal temperature of the polymerization reactor, and a pressure of 110-1 kPa, preferably 70-5 kPa, more preferably 30-10 kPa (absolute pressure) for 0.1-10 hours, preferably 0.5-3 hours, while the monohydroxy compound which generates is being removed from the reaction system by distillation.

In the second and any succeeding stages, the pressure of the reaction system is gradually lowered from the pressure used in the first stage, and the polymerization is conducted while the monohydroxy compound which generates is being continuously removed from the reaction system. Finally, the pressure (absolute pressure) of the reaction system is lowered to 200 Pa or below. The second and any succeeding stages are thus conducted at a maximum internal temperature of 210-270° C., preferably 220-250° C., for a period of generally 0.1-10 hours, preferably 1-6 hours, especially preferably 0.5-3 hours.

Especially from the standpoints of inhibiting a polycarbonate resin from taking a color or deteriorating thermally and of thereby obtaining a polycarbonate resin having a satisfactory hue and satisfactory light resistance, it is preferred that the maximum internal temperature in all reaction stages should be lower than 250° C., in particular 225-245° C. From the standpoints of inhibiting the rate of polymerization from decreasing in the latter half of the polymerization reaction and of thereby minimizing the deterioration caused by heat history, it is preferred to use, in the final stage of the polymerization, a horizontal reactor having excellent plug flow characteristics and interface renewal characteristics.

In the case where the polymerization is conducted at too high a temperature or for too long a period in order to obtain a polycarbonate resin having a given molecular weight, there is a tendency that the resultant polycarbonate resin has a reduced ultraviolet transmittance and an increased YI value.

From the standpoint of effective utilization of resources, it is preferred that the monohydroxy compound which generated as a by-product should be reused as a starting material for diphenyl carbonate, bisphenol A, or the like after purified according to need.

<Second Production Process>

A second process for polycarbonate resin production according to the invention is a process for producing a polycarbonate resin using a carbonic diester and at least one dihydroxy compound as starting-material monomers and a catalyst, by condensation-polymerizing the starting-material monomers by means of a transesterification reaction using a plurality of reactors in multiple stages, and is characterized in that the dihydroxy compound comprises a dihydroxy compound having the portion represented by the following general formula (1) as part of the structure thereof, at least one of the reactors from which the monohydroxy compound generated as a by-product of the transesterification reaction is distilled off in an amount at least 20% of a theoretical distillation removal amount is a reactor which has a capacity of 20 L or more and which is equipped with a heating means for heating the reactor by means of a heating medium and further equipped with a reflux condenser, the difference between the temperature of the heating medium and the temperature of the liquid reaction mixture present in the reactor being 5° C. or more, and the total amount of the monomers which are distilled off in all reaction stages is up to 10% by weight of the sum of the starting-material monomers.

[Chem. 22]

$$-(-CH_2-O-)- \quad (1)$$

(The case where the portion represented by general formula (1) is part of —CH$_2$—O—H is excluded.)

In the second production process, at least one of the reactors from which the monohydroxy compound is distilled off in an amount at least 20% of a theoretical distillation removal amount thereof has a capacity of 20 L or more, preferably 30 L or more. The larger the capacity of the reactor, the higher the effects of the invention.

In the second production process of the invention, the carbonic diester and the dihydroxy compound are subjected to polycondensation (often referred to simply as polymerization) by means of a transesterification reaction using a plurality of reactors in multiple stages in the presence of the catalyst described above. In this polymerization reaction, a monohydroxy compound (for example, phenol when diphenyl carbonate was used as the carbonic diester) generates as a by-product of the reaction. The polymerization is conducted while removing by distillation the by-product monohydroxy compound from the system. However, in the initial stage of the polymerization, the amount of the monohydroxy compound which generates as a by-product per unit period is large, and the removal of the monohydroxy compound deprives the system of a large amount of latent heat of vaporization. Consequently, in the invention, at least one of the reactors from which the monohydroxy compound is distilled off in an amount at least 20% of a theoretical distillation removal amount thereof is a reactor which is equipped with a heating means for heating the reactor by means of a heating medium, and the temperature of the heating medium which is being introduced is regulated so as to be higher than the temperature of the liquid reaction mixture present in the reactor (hereinafter often referred to as "internal temperature"), i.e., so as to result in a difference between these temperatures of at least 5° C. [(heating medium temperature)>(internal temperature)].

The theoretical distillation removal amount of the monohydroxy compound in the invention is the number of moles which is two times the number of moles of the carbonic diester used as a starting material. In the case of a batch reaction, the term "reactor from which the monohydroxy compound is distilled off in an amount at least 20% of the theoretical distillation removal amount" means a reactor in which the total amount of the monohydroxy compound that is distilled off from the one reactor is at least 20% of the theoretical distillation removal amount calculated from the amount of the carbonic diester compound that was fed at first as a starting material. In the case of a continuous reaction, that term means a reactor in which the amount of the monohydroxy compound that is distilled off from the one reactor per unit period is at least 20% of the theoretical distillation removal amount calculated from the amount of the carbonic diester that is fed as a starting material per unit period.

Examples of the heating means for heating the reactor by means of a heating medium include a jacket type disposed around the reactor (throughout the whole periphery or in part thereof) (hereinafter often referred to simply as "heating medium jacket"), a type which includes an internal coil disposed in the reactor, and a heat exchanger type disposed outside the reactor. However, it is preferred that the heating means should be a heating medium jacket. In the case of using a heating medium jacket, to further dispose an internal coil inside the reactor and thereby heat the reaction mixture also from the inside of the reactor and increase the area of heat-transfer surface for heating is effective for avoiding the necessity of excessively elevating the temperature of the heating medium within the jacket.

When the difference between the temperature of the heating medium and the temperature of the liquid reaction mixture is less than 5° C., there are the cases where the reactor has an impaired heat balance and the temperature of the liquid reaction mixture cannot be regulated to a given temperature. Especially in the case of larger reactors which employ, for example, a heating medium jacket as a heating means, the area of the heat-transfer surface of the heating medium jacket tends to be small as compared with the capacities of the reactors. It is therefore desirable that the difference between the temperature of the heating medium and the temperature of the liquid reaction mixture should be large. The difference therebetween is preferably 10° C. or more, especially preferably 15° C. or more.

Conversely, in the case where the difference between the temperature of the heating medium and the temperature of the liquid reaction mixture is too large, not only a starting-material monomer is distilled off in an increased amount but also the contents undergo a severer thermal deterioration. Consequently, the difference therebetween is preferably 80° C. or less, more preferably 40° C. or less, especially preferably 30° C. or less.

The temperature of the heating medium to be introduced may be suitably determined according to the desired temperature of the liquid reaction mixture. However, in the case where the temperature of the heating medium is too high, a starting-material monomer is distilled off in too large an amount. Consequently, the maximum temperature is preferably lower than 265° C., more preferably lower than 260° C., especially preferably lower than 255° C.

With respect to an operation for regulating the temperature of the heating medium so as to be higher by at least 5° C. than the temperature of the liquid reaction mixture, use may be made of a method in which the temperature of the heating medium is always kept higher by at least 5° C. throughout the period of the reaction within the one reactor. Alternatively, use may be made of a method in which the temperature regulation is conducted only during the period in which the monohydroxy compound is distilled off considerably. In general, the former method is used in continuous reactions, while the latter method is used in batch reactions.

In the invention, the term "temperature of the heating medium" means the temperature measured before the heating medium is introduced into the heating means. For example, in the case where the heating means is a heating medium jacket, that term means the temperature of the heating medium measured before the heating medium is introduced into the heating medium jacket disposed around the reactor (throughout the whole periphery or in part thereof). In the invention, the term "temperature of the liquid reaction mixture" means the temperature of the liquid reaction mixture measured with a measuring device, e.g., a thermocouple.

The internal temperature of at least one of the reactors from which the monohydroxy compound generated as a by-product of the polymerization reaction is distilled off in an amount at least 20% of a theoretical distillation removal amount, in the invention, is usually preferably 140-270° C., more preferably 180-240° C., even more preferably 200-230° C. In the case where the internal temperature thereof is too high, not only a starting-material monomer is distilled off in an increased amount but also thermal deterioration is enhanced. In the case where the internal temperature thereof is too low, the rate of reaction is low, resulting in a decrease in production efficiency.

In the invention, at least one of the reactors from which the monohydroxy compound is distilled off in an amount at least 20% of a theoretical distillation removal amount thereof is equipped with a reflux condenser in order to inhibit the monomers from being distilled off.

The temperature of the coolant to be introduced into the reflux condenser is preferably 45-180° C., more preferably 80-150° C., especially preferably 100-130° C., in terms of temperature as measured at the inlet of the reflux condenser. When the coolant has too high a temperature, there are the cases where the amount of the monomers being refluxed decreases, resulting in a decrease in the effect of the refluxing.

Conversely, when the temperature thereof is too low, there are the cases where the efficiency of the removal by distillation of the monohydroxy compound to be removed by distillation decreases. As the coolant, use may be made of hot water, steam, a heat-medium oil, or the like. It is preferred to use steam or a heat-medium oil.

It is preferred that reactors from which the monohydroxy compound is distilled off in an amount at least 10% of a theoretical distillation removal amount thereof should also be equipped with a reflux condenser in order to inhibit the monomers from being distilled off.

It is important in the second production process of the invention that the total amount of the monomers which are distilled off in all reaction stages should be up to 10% by weight of the sum of the starting-material monomers.

The term "total amount of the monomers which are distilled off in all reaction stages" (hereinafter sometimes referred to as "amount of the monomers distilled off") means the total amount of all monomers which were distilled off during the period from initiation to termination of the transesterification reaction.

In the case where the amount of the monomers distilled off exceeds 10% by weight of the sum of the starting-material monomers, this not only results in a decrease in material unit but also poses a problem that it becomes difficult to regulate the concentration of end groups, which affects quality, to a given value. In addition, in the case where a plurality of dihydroxy compounds are used, there is a possibility that the molar proportions of the dihydroxy compounds used might change during the polymerization, making it impossible to obtain a polycarbonate resin having a desired molecular weight and composition.

The amount of the monomers distilled off is preferably 5% by weight or less, more preferably 3% by weight or less, especially preferably 2% by weight or less, based on the sum of the starting-material monomers.

Smaller amounts of the monomers distilled off bring about a larger improvement in material unit. However, smaller amounts thereof necessitate an excessive reduction in internal temperature or heating medium temperature, an excessively elevated pressure, an increase in catalyst amount, or prolongation of the polymerization period, resulting in a decrease in polycarbonate resin production efficiency and a deterioration in quality. Consequently, the lower limit thereof is generally 0.2% by weight, preferably 0.4% by weight, more preferably 0.6% by weight.

The amount of monomers distilled off which has been specified in the invention can be attained by suitably selecting the kind and amount of a catalyst, temperature of the liquid reaction mixture, temperature of the heating medium, reaction pressure, residence time, refluxing conditions, etc. as described above.

For example, a prepolymer is obtained in the initial stage of the polymerization at a relatively low temperature under relatively low vacuum, and the molecular weight thereof is increased to a given value at a relatively high temperature under relatively high vacuum in the late stage of the polymerization. It is, however, important that a temperature of the heating medium, an internal temperature, and an internal pressure of the reaction system should be suitably selected for each molecular-weight stage. For example, in the case where either temperature or pressure is too speedily changed before the polymerization reaction reaches a given value, an unreacted monomer is distilled off to change the molar ratio of the dihydroxy compounds to the carbonic diester. There hence is a possibility that the polymerization rate might decrease or it might be impossible to obtain a polymer having a given molecular weight or having given end groups.

The selection of the kind and amount of a catalyst described above is also important for maintaining a suitable polymerization rate and inhibiting the monomers from being distilled off and for simultaneously enabling the finally obtained polycarbonate resin to have intact properties such as hue, thermal stability, and light resistance.

In the second production process of the invention, a polycarbonate resin is produced by polymerizing the starting materials in multiple stages using a catalyst and a plurality of reactors. The reasons why the polymerization is conducted in a plurality of reactors are that in the initial stage of the polymerization reaction, since the monomers are contained in a large amount in the liquid reaction mixture, it is important that the monomers should be inhibited from volatilizing off while maintaining a necessary polymerization rate, and that in the late stage of the polymerization reaction, it is important to sufficiently remove by distillation the by-product monohydroxy compound in order to shift the equilibrium to the polymerization side. For thus setting different sets of polymerization reaction conditions, it is preferred to use a plurality of polymerization reactors arranged serially, from the standpoint of production efficiency. With respect to the mode of reaction operation, it is preferred to employ the continuous type in which those stages are continuously performed.

The number of reactors to be used in the process of the invention is not limited so long as the number thereof is at least 2 as described above. From the standpoints of production efficiency, etc., the number thereof is 3 or more, preferably 3-5, especially preferably 4.

In the invention, the process may be conducted in various manners so long as two or more reactors are used. For example, a plurality of reaction stages differing in conditions are formed in any of the reactors to change the temperature and the pressure in stages or continuously.

Examples thereof include: the case in which two reactors are used to conduct polymerization in two stages using different sets of reaction conditions for the reactors; and the case in which two reactors are used in such a manner that two reaction stages differing in conditions are conducted in the first reactor and the second reactor is operated under one set of reaction conditions, thereby performing polymerization in three stages.

In the invention, the catalyst can be introduced into a starting-material preparation tank or a starting-material storage tank, or can be introduced directly into a reactor. However, from the standpoints of the stability of feeding and polymerization control, a catalyst supply line is disposed somewhere in a starting-material line before a reactor, and the catalyst is supplied preferably in the form of an aqueous solution.

With respect to transesterification reaction temperature, too low temperatures result in a decrease in productivity and cause the product to undergo an enhanced heat history. Too high temperatures not only result in monomer volatilization but also result in the possibility of enhancing degradation and coloring of the polycarbonate resin.

With respect to the internal temperature of at least one of the reactors from which the by-product monohydroxy compound is distilled off in an amount at least 20% of a theoretical distillation removal amount, the maximum temperature thereof is 140-270° C., preferably 180-240° C., more preferably 200-230° C., as stated above. Other conditions include a pressure of generally 110-1 kPa, preferably 70-5 kPa, more preferably 30-10 kPa (absolute pressure), and a period of generally 0.1-10 hours, preferably 0.5-3 hours. The transesterification reaction is conducted under such conditions while the monohydroxy compound which generates is being removed from the reaction system by distillation.

In the second and any succeeding stages, the pressure of the reaction system is gradually lowered from the pressure used in the first stage, and the polymerization is conducted while the monohydroxy compound which generates is being continuously removed from the reaction system. Finally, the pressure (absolute pressure) of the reaction system is lowered to generally 1,000 Pa or below, preferably 200 Pa or below. The second and any succeeding stages are thus conducted at a maximum internal temperature of 210-270° C., preferably 220-250° C.

Especially from the standpoints of inhibiting the polycarbonate resin from taking a color or deteriorating thermally and of regulating the amount of monomers distilled off to up to 10% by weight of the sum of the starting-material monomers, it is preferred that the maximum internal temperature in all reaction stages should be lower than 250° C., in particular 225-245° C. In this process of the invention, it is preferred from the standpoint of effective utilization of resources that the monohydroxy compound which generated as a by-product should be reused as a starting material for a carbonic diester, bisphenol compound, or the like after purified according to need.

<Third Production Process>

A third process for polycarbonate resin production according to the invention is a process for producing a polycarbonate resin using a carbonic diester and at least one dihydroxy compound as starting-material monomers and a catalyst, by condensation-polymerizing the starting-material monomers by means of a transesterification reaction using a plurality of reactors in multiple stages, and is characterized in that the dihydroxy compound comprises a plurality of dihydroxy compounds, at least one of which is a dihydroxy compound having the portion represented by the following general formula (1) as part of the structure thereof, at least one of the reactors from which the monohydroxy compound generated as a by-product of the transesterification reaction is distilled off in an amount at least 20% of a theoretical distillation removal amount is a reactor which has a capacity of 20 L or more and which is equipped with a heating means for heating the reactor by means of a heating medium and further equipped with a reflux condenser, the difference between the temperature of the heating medium and the temperature of the liquid reaction mixture present in the reactor being 5° C. or more, and the value obtained by dividing the difference between the molar proportion in percentage of each dihydroxy compound which is being fed as a starting material to the reactors and the molar proportion in percentage of structural units of the dihydroxy compound which are contained in the resultant polycarbonate resin by the molar proportion in percentage of the dihydroxy compound which is being fed as a starting material to the reactors is 0.03 or less in terms of absolute value with respect to at least one dihydroxy compound and is not larger than 0.05 in terms of absolute value with respect to each of all dihydroxy compounds.

[Chem. 23]

(1)

(The case where the portion represented by general formula (1) is part of —CH$_2$—O—H is excluded.)

This process is explained in more detail. The reactors, heating means, reflux condenser, temperature conditions for each device, and the like are as explained above with regard to the second production process. In the third production process, however, a plurality of dihydroxy compounds are used as a starting material. When the molar proportions in percentage of the dihydroxy compounds fed as a starting material to the reactors are expressed respectively by A, B, C . . . N (% by mole) and the molar proportions in percentage of structural units in the resultant polycarbonate resin which are derived from the respective dihydroxy compounds are respectively expressed by a, b, c . . . n (% by mole), then at least one of (|(a−A)/A|, |(b−B)/B|, |(c−C)/C|, . . . , |(n−N)/N|) is 0.03 or less, preferably 0.02 or less, more preferably 0.01 or less, especially preferably 0.005 or less. Those absolute values for the respective dihydroxy compounds each must be less than 0.05, and are preferably 0.03 or less, more preferably 0.02 or less, even more preferably 0.01 or less, especially preferably 0.005 or less. These values can be attained by suitably selecting the kind and amount of a catalyst, transesterification reaction temperature (internal temperature), temperature of the heating medium, pressure, residence time, refluxing conditions, etc. as described above.

(Dihydroxy Compounds)

In the second and third processes of the invention, the dihydroxy compounds described above are suitable for the dihydroxy compounds to be used as starting-material monomers.

(Carbonic Diester)

In the second and third processes of the invention, the carbonic diesters described above are suitable for the carbonic diester to be used as a starting-material monomer.

In the second and third processes of the invention, it is preferred that the dihydroxy compounds and carbonic diester as starting materials should be evenly mixed prior to the transesterification reaction.

The temperature at which the starting materials are mixed together is generally 80° C. or higher, preferably 90° C. or higher, and the upper limit thereof is generally 250° C. or lower, preferably 200° C. or lower, more preferably 150° C. or lower. Especially suitable is a temperature of 100-120° C. In the case where the mixing temperature is too low, there is the possibility of resulting in too low a dissolution rate or in insufficient solubility. In addition, there are often the cases where troubles such as solidification arise. When the mixing temperature is too high, there are the cases where the dihydroxy compounds deteriorate thermally. There is hence a possibility that the polycarbonate resin obtained has an impaired hue and this adversely affects light resistance and heat resistance.

It is preferred in the second and third processes of the invention that an operation for mixing the starting materials, i.e., dihydroxy compounds including the dihydroxy compound according to the invention and a carbonic diester, should be conducted in an atmosphere having an oxygen concentration of generally 10 vol % or less. From the standpoint of preventing hue deterioration, it is preferred to conduct the operation in an atmosphere having an oxygen concentration of 0.0001-10 vol %, in particular 0.0001-5 vol %, especially 0.0001-1 vol %.

In the invention, the carbonic diester is used in such an amount that the molar proportion thereof to all dihydroxy compounds to be subjected to the reaction, which include the dihydroxy compound according to the invention, is generally 0.90-1.20, preferably 0.95-1.10, more preferably 0.97-1.03, especially preferably 0.99-1.02. Either too high or too low molar proportions thereof result in a decrease in the rate of transesterification reaction and enhanced heat history during the polymerization reaction.

There hence is a possibility that the resultant polycarbonate resin might have an impaired hue. There also is a possibility that a desired high-molecular polymer might not be obtained.
(Transesterification Catalyst)

In the second and third production processes of the invention, a transesterification catalyst is made to be present when dihydroxy compounds including the dihydroxy compound according to the invention are condensation-polymerized with a carbonic diester by means of a transesterification reaction as described above. Namely, a specific compound is made to be present in the first reactor from which the monohydroxy compound generated as a by-product of the polymerization reaction is distilled off in an amount at least 20% of a theoretical distillation removal amount.

The transesterification reaction catalyst (polymerization catalyst) used in the processes of the invention can affect light transmittance as measured especially at a wavelength of 350 nm and yellowness index (YI) value.

The transesterification catalysts described above are suitable for the transesterification catalyst to be used.

The amount of the catalyst to be used is usually preferably 0.1-300 μmol, more preferably 0.5-100 μmol, per mole of all dihydroxy compounds used. Especially in the case where use is made of one or more compounds of at least one metal selected from lithium and the Group-2 metals of the long-form periodic table, the amount of this catalyst is generally 0.1 μmol or more, preferably 0.5 μmol or more, especially preferably 0.7 μmol or more, in terms of metal amount per mole of all dihydroxy compounds used. The suitable upper limit thereof is generally 20 μmol, preferably 10 μmol, more preferably 3 μmol, especially preferably 1.5 μmol, in particular 1.0 μmol.

The catalyst may be directly introduced into the reactor. Alternatively, use may be made of a method in which the catalyst is introduced into a starting-material preparation tank for mixing the dihydroxy compounds with the carbonic diester beforehand and is thereafter caused to be present in the reactor.

In the case where the catalyst is used in too small an amount, sufficient polymerization activity is not obtained and the polymerization reaction proceeds at a reduced rate, making it difficult to obtain a polycarbonate resin having a desired molecular weight. In addition, the amount of starting-material monomers which are incorporated into the polycarbonate resin decreases and the amount of monomers which are distilled off together with the by-product monohydroxy compound increases, resulting in a possibility that the material unit might decrease and additional energy might be required for the recovery of the monomers. Furthermore, in the case of copolymerization using a plurality of dihydroxy compounds, the increase in the amount of monomers which are distilled off may be causative of a difference between the proportions of the monomers used as starting materials and the ratio among the constituent units in the product polycarbonate resin which are derived from the monomer units.

On the other hand, when the catalyst is used in too large an amount, those problems caused by the excessively large amount of monomers distilled off tend to be mitigated. However, too large catalyst amounts result in a possibility that the polycarbonate resin obtained might have deteriorated properties concerning hue, light resistance, thermal stability, etc.

There is a possibility that when Group-1 metals, especially sodium, potassium, and cesium, in particular, lithium, sodium, potassium, and cesium, are contained in a polycarbonate resin in a large amount, these metals might adversely affect the hue. These metals do not come only from the catalyst used but may come from starting materials and the reactor. Consequently, the total amount of compounds of those metals in the polycarbonate resin is generally 1 weight ppm or less, preferably 0.8 weight ppm or less, more preferably 0.7 weight ppm or less, in terms of metal amount.

The content of metals in a polycarbonate resin can be determined by recovering the metals contained in the polycarbonate resin by a technique such as wet ashing and then determining the amount of the metals using a technique such as atomic emission, atomic absorption, or inductively coupled plasma (ICP) spectroscopy.

In the invention, by inhibiting the monomers from volatilizing off during the polymerization reaction, the molar ratio between the dihydroxy compounds and the carbonic diester which are used as starting materials can be kept at around the theoretical value of 1.00. Consequently, a polycarbonate resin having a high molecular weight and a satisfactory hue is obtained without lowering the rate of polymerization.
(Polycarbonate Resins Obtained)

It is preferred that the polycarbonate resins obtained by the second and third production processes of the invention should be polycarbonate resins which each give a molded object (thickness, 3 mm) that has a light transmittance, as measured at a wavelength of 350 nm, of 60% or higher. The light transmittance thereof is more preferably 65% or higher, especially preferably 70% or higher. When the light transmittance thereof at that wavelength is less than 60%, there are the cases where this polycarbonate resin shows enhanced absorption and has impaired light resistance.

It is also preferred that the polycarbonate resins obtained by the second and third production processes of the invention should be polycarbonate resins which each give a molded object (flat plate having a thickness of 3 mm) that has a light transmittance, as measured at a wavelength of 320 nm, of 30% or higher. This light transmittance of the molded object is more preferably 40% or higher, especially preferably 50% or higher. In the case where the light transmittance thereof at that wavelength is lower than 30%, the polycarbonate resin tends to have impaired light resistance.

It is preferred that the polycarbonate resins obtained by the second and third production processes of the invention should be polycarbonate resins which each give a molded object (thickness, 3 mm) that has a yellowness index (YI) value, as measured with respect to transmitted light in accordance with ASTM D1925-70, of 12 or less after having been irradiated with light for 100 hours using a metal halide lamp in an environment of 63° C. and a relative humidity of 50% at an irradiance for the wavelength range of 300-400 nm of 1.5 kW/m². The yellowness index value thereof is more preferably 10 or less, especially preferably 8 or less.

Furthermore, the polycarbonate resins obtained by the second and third processes of the invention each preferably are a polycarbonate resin which, when molded into a flat plate having a thickness of 3 mm and examined, without being subjected to the irradiation using a metal halide lamp as described above or the like, has a yellowness index value (i.e., initial yellowness index value; referred to as initial YI value) as measured with respect to transmitted light of generally 10 or less. The initial YI value thereof is more preferably 7 or less, especially preferably 5 or less. The difference in yellowness index value between before and after the metal halide lamp irradiation is preferably 6 or less, more preferably 4 or less, especially preferably 3 or less, in terms of absolute value.

In the case where the initial yellowness index (YI) value thereof exceeds 10, this resin tends to have impaired light resistance. In the case where the absolute value of the difference in yellowness index (YI) value between before and after the metal halide lamp irradiation exceeds 6, there is a possibility that the resin might take a color when exposed to sunlight, artificial lighting, or the like over a long period to become unusable in applications where transparency is especially required and in other applications.

Moreover, the polycarbonate resins obtained by the second and third processes of the invention each preferably are a polycarbonate resin which, when molded into a flat plate having a thickness of 3 mm and examined, has an L* value, as provided for by International Illumination Commission (CIE) and measured with respect to transmitted light, of generally 96.3 or higher. The L* value thereof is more preferably 96.6 or higher, especially preferably 96.8 or higher. In the case where the L* value thereof is less than 96.3, the resin tends to have impaired light resistance.

Such a polycarbonate resin can be produced by a process which satisfies the features of the invention described above, while taking measures such as, for example, limiting the concentration of specific metals during the polymerization, suitably selecting the kind and amount of a catalyst, suitably selecting a polymerization temperature and polymerization period, reducing the content of compounds causative of coloring, such as residual monomers, residual phenol, and residual diphenyl carbonate, and reducing the amount of impurities which are contained in the starting-material monomers and serve as coloring matter. In particular, the kind and amount of a catalyst, polymerization temperature, and polymerization period are important.

The molecular weights of the polycarbonate resins obtained by the production processes of the invention described above can be expressed in terms of reduced viscosity. The reduced viscosities thereof are generally 0.30 dL/g or higher, preferably 0.35 dL/g or higher. The upper limit of the reduced viscosities thereof is preferably 1.20 dL/g or less, more preferably 1.00 dL/g or less, even more preferably 0.80 dL/g or less.

In the case where the reduced viscosities of the polycarbonate resins are too low, there is a possibility that these polycarbonate resins might give molded articles having low mechanical strength. In the case where the reduced viscosities thereof are too high, these polycarbonate resins tend to show poor flowability during molding, resulting in decreases in productivity and moldability.

Incidentally, the reduced viscosity of a polycarbonate is determined by preparing a solution thereof having a polycarbonate concentration precisely adjusted to 0.6 g/dL using methylene chloride as a solvent and measuring the viscosity of the solution with a Ubbelohde viscometer at a temperature of 20.0±0.1° C.

In each of the polycarbonate resins obtained by the production processes of the invention, the lower limit of the concentration of the end group represented by the following structural formula (3) is usually preferably 20 μeq/g, more preferably 40 μeq/g, especially preferably 50 μeq/g. The upper limit thereof is usually preferably 160 μeq/g, more preferably 140 μeq/g, especially preferably 100 μeq/g.

In the case where the concentration of the end group represented by the following structural formula (3) is too high, there is a possibility that even when the polycarbonate resin has a satisfactory hue immediately after polymerization or during molding, the high end group concentration might result in a hue deterioration through exposure to ultraviolet rays. Conversely, in the case where the concentration thereof is too low, there is a possibility that this polycarbonate resin might have reduced thermal stability.

Examples of methods for regulating the concentration of the end group represented by the following structural formula (3) include: to regulate the molar proportions of the starting materials, i.e., at least one dihydroxy compound including the dihydroxy compound according to the invention and a carbonic diester; and to control factors during the transesterification reaction, such as polymerization pressure, polymerization temperature, and the temperature of the reflux condenser, according to the volatility of the monomers. According to the invention, since monomer volatilization can be inhibited, it is easy to regulate the end group concentration on the basis of the molar proportions of the starting materials.

[Chem. 24]

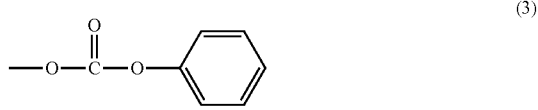

(3)

The polycarbonate resins obtained by the production processes of the invention through polycondensation as described above are usually solidified by cooling and pelletized with a rotary cutter or the like.

Methods for the pelletization are not limited. Examples thereof include: a method in which the polycarbonate resin is discharged in a molten state from the final polymerization reactor, cooled and solidified in a strand form, and pelletized; a method in which the resin is fed in a molten state from the final polymerization reactor to a single- or twin-screw extruder, melt-extruded, subsequently cooled and solidified, and pelletized; and a method which includes discharging the resin in a molten state from the final polymerization reactor, cooling and solidifying the resin in a strand form, temporarily pelletizing the resin, thereafter feeding the resin to a single- or twin-screw extruder again, melt-extruding the resin, and then cooling, solidifying, and pelletizing the resin.

During such operations, residual monomers can be removed by volatilization under vacuum within the extruder. It is also possible to add generally known additives such as a heat stabilizer, neutralizing agent, ultraviolet absorber, release agent, colorant, antistatic agent, slip agent, lubricant, plasticizer, compatibilizing agent, and flame retardant and knead the mixture within the extruder.

The temperature to be used for melt kneading in the extruder depends on the glass transition temperature and molecular weight of the polycarbonate resin. However, the melt kneading temperature is generally 150-300° C., preferably 200-270° C., more preferably 230-260° C. In the case where the melt kneading temperature is lower than 150° C., the polycarbonate resin has a high melt viscosity and imposes an increased load on the extruder, resulting in a decrease in productivity. In the case where the melt kneading temperature is higher than 300° C., the polycarbonate thermally deteriorates considerably, resulting in a decrease in mechanical strength due to the decrease in molecular weight and further resulting in coloring and gas evolution.

In the polycarbonate resin production processes of the invention, it is desirable to dispose a filter in order to prevent inclusion of foreign matter. The position where a filter is disposed preferably is on the downstream side of the extruder. The rejection size (opening size) of the filter is preferably 100 μm or smaller in terms of 99% removal filtration accuracy. Especially when the resin is for use in film applications or the like for which inclusion of minute foreign particles should be avoided, the opening size of the filter is preferably 40 μm or smaller, more preferably 10 μm or smaller.

From the standpoint of preventing inclusion of foreign matter from occurring after extrusion, it is desirable to extrude the polycarbonate resin in a clean room having a cleanliness preferably higher than class 7 defined in JIS B 9920 (2002), more preferably higher than class 6.

Furthermore, for cooling and pelletizing the extruded polycarbonate resin, it is preferred to use a cooling method such as air cooling or water cooling. It is desirable that air from which airborne foreign matter has been removed beforehand with a high-efficiency particulate air filter or the like should be used for the air cooling to prevent airborne foreign matter from adhering again. In the case of conducting water cooling, it is desirable to use water from which metallic substances have been removed with an ion-exchange resin or the like and from which foreign matter has been removed with a filter. It is preferred that the filter to be used should have an opening size of 10-0.45 μm in terms of 99% removal filtration accuracy.

The polycarbonate resins obtained by the production processes of the invention can be formed into molded objects by generally known techniques such as injection molding, extrusion molding, and compression molding.

Before the polycarbonate resins are molded by various molding techniques, additives such as a heat stabilizer, neutralizing agent, ultraviolet absorber, release agent, colorant, antistatic agent, slip agent, lubricant, plasticizer, compatibilizing agent, and flame retardant can be incorporated into the polycarbonate resins according to need by means of a tumbling mixer, supermixer, floating mixer, twin-cylinder mixer, Nauta mixer, Banbury mixer, extruder, or the like.

The polycarbonate resins obtained by the production processes of the invention each can be kneaded together with one or more polymers selected, for example, from synthetic resins such as aromatic polycarbonates, aromatic polyesters, aliphatic polyesters, polyamides, polystyrene, polyolefins, acrylic resins, amorphous polyolefins, ABS, and AS, biodegradable resins such as poly(lactic acid) and poly(butylene succinate), and rubbers, and used as a polymer alloy.

According to the invention, polycarbonate resins having excellent light resistance, transparency, hue, heat resistance, thermal stability, and mechanical strength can be provided, and polycarbonate resins which stably show these performances can be efficiently produced while reducing monomer loss.

EXAMPLES

The invention will be explained below in more detail by reference to Examples. However, the invention should not be construed as being limited by the following Examples unless the invention departs from the spirit thereof.

Examples 1 to 3

In the following, properties of polycarbonates were evaluated by the following methods.
(1) Measurement of Oxygen Concentration The concentration of oxygen in a polymerization reactor was measured with an oxygen analyzer (1000RS, manufactured by AMI Inc.).
(2) Measurement of Reduced Viscosity A sample of a polycarbonate resin was dissolved using methylene chloride as a solvent to prepare a polycarbonate solution having a concentration of 0.6 g/dL. Using a Ubbelohde viscometer manufactured by Moritomo Rika Kogyo, a measurement was made at a temperature of 20.0±0.1° C. The relative viscosity ηrel was determined from the flow-down time of the solvent $t_0$ and the flow-down time of the solution t using the following equation.

$$\eta rel = t/t_0$$

The specific viscosity ηsp was determined from the relative viscosity using the following equation.

$$\eta sp = (\eta - \eta_0)/\eta_0 = \eta rel - 1$$

The specific viscosity was divided by the concentration c (g/dL) to determine the reduced viscosity ηsp/c. The larger the value thereof, the higher the molecular weight.
(3) Determination of Proportion of Structural Units derived from each Dihydroxy Compound in Polycarbonate Resin and Determination of Concentration of Terminal Phenyl Groups The proportion of structural units derived from each dihydroxy compound and contained in a polycarbonate resin was determined in the following manner. Thirty milligrams of the polycarbonate resin was weighed out and dissolved in about 0.7 mL of chloroform-d to obtain a solution, and this solution was introduced into a tube for NMR spectroscopy which had an inner diameter of 5 mm. The solution was examined for $^1$H NMR spectrum at ordinary temperature using JNM-AL400 (resonance frequency, 400 MHz), manufactured by JEOL Ltd. The proportions of structural units derived from respective dihydroxy compounds were determined from an intensity ratio among signals attributable to the structural units derived from the respective dihydroxy compounds. With respect to the concentration of terminal phenyl groups, the polycarbonate resin was examined for $^1$H NMR spectrum in the same manner as described above using 1,1,2,2-tetrabromoethane as an internal reference, and the concentration was determined from an intensity ratio between a signal attributable to the internal reference and a signal attributable to terminal phenyl groups.
(4) Determination of Concentration of Metals in Polycarbonate Resin About 0.5 g of polycarbonate resin pellets were precisely weighed out and put in a microwave decomposition vessel manufactured by PerkinElmer, Inc., and 2 mL of 97% sulfuric acid was added thereto. This vessel was closed and heated with a microwave at 230° C. for 10 minutes. After the vessel was cooled to room temperature, 1.5 mL of 68% nitric acid was added to the contents. This vessel was closed, heated with a microwave at 150° C. for 10 minutes, and then cooled again to room temperature. To the contents was added 2.5 mL of 68% nitric acid. This vessel was closed again and heated with a microwave at 230° C. for 10 minutes to completely decompose the contents. After the vessel was cooled to room temperature, the liquid thus obtained was diluted with pure water and examined for metal concentration with an ICP-MS apparatus manufactured by Thermo Quest Corp.

(5) Determination of Concentration of Phenol and Concentration of DPC in Polycarbonate Resin A 1.25-g portion of a polycarbonate resin sample was dissolved in 7 mL of methylene chloride to obtain a solution. Acetone was added thereto in such an amount as to result in a total volume of 25 mL, thereby conducting reprecipitation. Subsequently, the liquid thus treated was filtered through a 0.2-μm disk filter and subjected to quantitative analysis by liquid chromatography.

(6) Method for Evaluating Initial Hue of Polycarbonate Resin

Pellets of a polycarbonate resin were dried at 110° C. for 10 hours in a nitrogen atmosphere. Subsequently, the dried polycarbonate resin pellets were fed to an injection molding machine (Type J75EII, manufactured by The Japan Steel Works, Ltd.), and an operation for forming injection-molded pieces (60 mm (width)×60 mm (length)×3 mm (thickness)) was repeated under the conditions of a resin temperature of 220° C. and a molding cycle of 23 seconds. The injection-molded pieces obtained by the 10th shot to the 20th shot were examined for yellowness index (initial YI) value and L* value with respect to thickness-direction transmitted light using a color tester (CM-3700d, manufactured by Konica Minolta Inc.), and an average thereof was calculated. The smaller the YI value, the less the yellowness and the better the quality. The larger the L* value, the higher the lightness.

(7) Method for Evaluating Hue of Polycarbonate Resin which Stagnated in Heated State In the evaluation of the initial hue of a polycarbonate resin described above, the molding cycle in the molding for forming injection-molded pieces with the injection molding machine was changed to 60 seconds after the 19th shot and the molding operation was repeated under these conditions from the 20th shot to the 30th shot. The injection-molded articles obtained by the 30th shot were examined for YI value with respect to thickness-direction transmitted light using the color tester, and an average thereof was calculated.

(8) Measurement of Light Transmittance at Wavelengths of 350 nm and 320 nm

Injection-molded pieces (60 mm (width)×60 mm (length)×3 mm (thickness); 10th shot to 20th shot) obtained in (6) above were examined for thickness-direction light transmittance using a spectrophotometer for ultraviolet and visible regions (U2900, manufactured by Hitachi High-Technologies Corp.), and an average thereof was calculated to evaluate the light transmittance.

(9) Ratio of Number of Moles of H Bonded to Aromatic Rings (A) to Number of Moles of all H (A+B) (where B is the Number of Moles of H Not Bonded to Aromatic Rings)

Chloroform-d which had been mixed beforehand with tetramethylsilane (TMS) as an internal reference was examined alone for spectrum to determine a ratio of the signal of the TMS to the signal of residual H contained in the chloroform-d. Subsequently, 30 mg of a polycarbonate resin was weighed out and dissolved in about 0.7 mL of the chloroform-d. This solution was introduced into a tube for NMR spectroscopy which had an inner diameter of 5 mm and examined for $^1$H NMR spectrum at ordinary temperature using JNM-AL400 (resonance frequency, 400 MHz), manufactured by JEOL Ltd. The integral of the signal of residual H contained in the chloroform-d (the integral being determined from the integral of the signal of the TMS and from the ratio of the TMS to residual H contained in the chloroform-d as determined above) was subtracted from the integral of a signal which appeared at 6.5-8.0 ppm in the resultant NMR chart, and the value obtained is expressed by a. On the other hand, the integral of a signal which appeared at 0.5-6.5 ppm is expressed by b. Then, a/(a+b)=A/(A+B) holds. Consequently, the left side was determined.

(10) Metal Halide Lamp Irradiation Test

Metaling Weather Meter M6T, manufactured by Suga Test Instruments Co., Ltd., was used. A horizontal Metaling Lamp and quartz were attached thereto as a light source and an inner filter, respectively, and a #500 filter was attached as an outer filter to the periphery of the lamp. The apparatus was set so as to result in an irradiance for wavelength range 300-400 nm of 1.5 kW/m$^2$, and a square surface of a flat plate (60 mm (width)×60 mm (length) δ 3 mm (thickness)) obtained by the 20th shot in (6) above was irradiated with light for 100 hours under the conditions of 63° C. and a relative humidity of 50%. After the irradiation, the flat plate was examined for YI value in the same manner as in (6) above.

The abbreviations for compounds used in the following Examples are as follows.

ISB: isosorbide (trade name, POLYSORB; manufactured by Roquette Freres)
CHDM: 1,4-cyclohexanedimethanol (SKY CHDM, manufactured by New Japan Chemical Co., Ltd., for Examples 1 and 2; CHDM manufactured by Eastman Ltd. for Example 3)
DEG: diethylene glycol (manufactured by Mitsubishi Chemical Corp.)
BPA: bisphenol A (manufactured by Mitsubishi Chemical Corp.)
DPC: diphenyl carbonate (manufactured by Mitsubishi Chemical Corp.)

Example 1

Example 1-1

ISB, CHDM, DPC which had been purified by distillation to reduce the chloride ion concentration thereof to 10 ppb or less, and calcium acetate monohydrate were introduced in an ISB/CHDM/DPC/calcium acetate monohydrate molar ratio of 0.70/0.30/1.00/1.3×10$^{-6}$ into a polymerization reactor equipped with a stirrer and a reflux condenser regulated to 100° C. Nitrogen displacement was sufficiently conducted (oxygen concentration, 0.0005-0.001 vol %). Subsequently, the contents were heated with a heat medium, and stirring was initiated at the time when the internal temperature reached 100° C. The contents were melted and homogenized while regulating the internal temperature to 100° C. Thereafter, heating was initiated, and the internal temperature was elevated to 210° C. over 40 minutes. At the time when the internal temperature reached 210° C., the polymerization reactor was regulated so as to maintain this temperature and pressure reduction was initiated simultaneously. The internal pressure was reduced to 13.3 kPa (absolute pressure; the same applies hereinafter) over 90 minutes from the time when 210° C. had been reached. The contents were held for further 60 minutes while maintaining that pressure. The phenol vapor which generated as a by-product with the progress of the polymerization reaction was introduced into the reflux condenser, in which steam regulated so as to have a temperature of 100° C. as measured at the inlet of the reflux condenser was used as a coolant. The monomer ingredients contained in a slight amount in the phenol vapor were returned to the polymerization reactor, and the phenol vapor, which remained uncondensed, was subsequently introduced into a condenser employing 45° C. warm water as a coolant and recovered.

After the internal pressure was temporarily returned to atmospheric pressure, the contents, which had been thus oligomerized, were transferred to another polymerization reactor equipped with a stirrer and a reflux condenser regulated in the same manner as described above. Heating and pressure reduction were initiated, and the internal temperature was elevated to 220° C. and the pressure was reduced to 200 Pa, over 60 minutes. Thereafter, the internal temperature was elevated to 230° C. and the pressure was reduced to 133 Pa or below, over 20 minutes. At the time when a given stirring power was reached, the pressure was returned to atmospheric pressure. The contents were discharged in the form of a strand and pelletized with a rotary cutter.

Using a twin-screw extruder having two vent holes (LABOTEX30HSS-32) manufactured by The Japan Steel Works, Ltd., the pellets obtained were extruded into a strand form while regulating the outlet resin temperature to 250° C. The extrudate was cooled and solidified with water, and then pelletized with a rotary cutter. In this operation, the vent holes were connected to a vacuum pump, and the pressure as measured at the vent holes was regulated to 500 Pa. The results of analysis of the polycarbonate resin obtained and the results of evaluation thereof conducted by the methods described above are shown in Table 1. The polycarbonate resin obtained had low yellowness, excellent lightness, and a satisfactory color tone. This resin further had satisfactory light resistance.

Example 1-2

The same procedure as in Example 1-1 was conducted, except that the molar proportions of ISB and CHDM were changed. As in Example 1-1, a polycarbonate resin which had low yellowness, excellent lightness, and a satisfactory color tone and which further had satisfactory light resistance was obtained.

Example 1-3

The same procedure as in Example 1-1 was conducted, except that ISB, CHDM, DPC, and calcium acetate monohydrate were introduced in an ISB/CHDM/DPC/calcium acetate monohydrate molar ratio of $0.70/0.30/1.00/2.5 \times 10^{-6}$. As in Example 1-1, a polycarbonate resin which had low yellowness, excellent lightness, and a satisfactory color tone and which further had satisfactory light resistance was obtained.

Example 1-4

The same procedure as in Example 1-1 was conducted, except that ISB, CHDM, DPC, and calcium acetate monohydrate were introduced in an ISB/CHDM/DPC/calcium acetate monohydrate molar ratio of $0.70/0.30/1.00/0.9 \times 10^{-6}$. A polycarbonate resin which had lower yellowness, higher lightness, and a better color tone than in Example 1-1 was obtained. This resin further had satisfactory light resistance.

Example 1-5

The same procedure as in Example 1-3 was conducted, except that magnesium acetate tetrahydrate was used in place of the calcium acetate monohydrate. As in Example 1-3, a polycarbonate resin which had low yellowness, excellent lightness, and a satisfactory color tone and which further had satisfactory light resistance was obtained.

Example 1-6

The same procedure as in Example 1-3 was conducted, except that barium acetate was used in place of the calcium acetate monohydrate. As in Example 1-3, a polycarbonate resin which had low yellowness, excellent lightness, and a satisfactory color tone and which further had satisfactory light resistance was obtained.

Example 1-7

The same procedure as in Example 1-3 was conducted, except that lithium acetate was used in place of the calcium acetate monohydrate. As in Example 1-3, a polycarbonate resin which had low yellowness, excellent lightness, and a satisfactory color tone and which further had satisfactory light resistance was obtained.

Example 1-8

The same procedure as in Example 1-3 was conducted, except that DEG was used in place of the CHDM. As in Example 1-3, a polycarbonate resin which had low yellowness, excellent lightness, and a satisfactory color tone and which further had satisfactory light resistance was obtained.

Example 1-9

The same procedure as in Example 1-3 was conducted, except that the evacuation through the vent holes of the extruder was omitted. The polycarbonate resin obtained had a slightly lower ultraviolet transmittance than in Example 1-3.

Example 1-10

The same procedure as in Example 1-3 was conducted, except that cesium carbonate was used in place of the calcium acetate monohydrate and that the temperature in the final stage of the polymerization was changed to 226° C. The polycarbonate resin obtained had slightly lower light resistance than in Example 1-3.

Comparative Example 1-1

The same procedure as in Example 1-3 was conducted, except that cesium carbonate was used in place of the calcium acetate monohydrate. The polycarbonate resin obtained had a lower ultraviolet transmittance, a higher YI value, and lower lightness and light resistance than in Example 1-3.

Comparative Example 1-2

The same procedure as in Example 1-3 was conducted, except that ISB, CHDM, BPA, DPC, and calcium acetate monohydrate were introduced in an ISB/CHDM/BPA/DPC/calcium acetate monohydrate molar ratio of $0.70/0.20/0.10/1.00/2.5 \times 10^{-6}$. The polycarbonate resin obtained had a lower ultraviolet transmittance, a higher YI value, and lower lightness and light resistance than in Example 1-3.

Comparative Example 1-3

The same procedure as in Example 1-3 was conducted, except that the temperature in the final stage of the polymerization was changed to 260° C. The polycarbonate resin obtained had a lower ultraviolet transmittance, a higher YI value, and lower lightness and light resistance than in Example 1-3.

Comparative Example 1-4

The same procedure as in Example 1-3 was conducted, except that cesium carbonate was introduced in place of the calcium acetate monohydrate in the amount shown in Table 1 and that the temperature in the final stage of the polymerization was changed to 250° C. The polycarbonate resin obtained had a lower ultraviolet transmittance, a higher YI value, and lower lightness and light resistance than in Example 1-3.

TABLE 1

| | | | | Example | | | | | | |
|---|---|---|---|---|---|---|---|---|---|---|
| | | | | 1-1 | 1-2 | 1-3 | 1-4 | 1-5 | 1-6 | 1-7 |
| Amount of catalyst used (metal amount) | | Mg | μmol per mol of dihydroxy compounds | — | — | — | — | 2.5 | — | — |
| | | Ca | | 1.3 | 1.3 | 2.5 | 0.9 | — | — | — |
| | | Ba | | — | — | — | — | — | 2.5 | — |
| | | Li | | — | — | — | — | — | — | 2.5 |
| | | Cs | | — | — | — | — | — | — | — |
| Polycarbonate resin | Proportion of structural units derived from each dihydroxy compound | ISB | mol % | 69.9 | 50.0 | 70.0 | 70.0 | 69.9 | 70.0 | 69.9 |
| | | CHDM | | 30.1 | 50.0 | 30.0 | 30.0 | 30.1 | 30.0 | 30.1 |
| | | DEG | | 0.0 | 0.0 | 0.0 | 0.0 | 0.0 | 0.0 | 0.0 |
| | | BPA | | 0.0 | 0.0 | 0.0 | 0.0 | 0.0 | 0.0 | 0.0 |
| | Concentration of Na, K, and Cs (total) | | weight ppm | 0.6 | 0.8 | 0.6 | 0.6 | 0.6 | 0.6 | 0.6 |
| | Concentration of Li | | weight ppm | <0.05 | <0.05 | <0.05 | <0.05 | <0.05 | <0.05 | 0.13 |
| | Reduced viscosity | | dL/g | 0.48 | 0.60 | 0.51 | 0.50 | 0.49 | 0.47 | 0.49 |
| | Phenol content | | weight ppm | 204 | 221 | 216 | 200 | 220 | 205 | 207 |
| | DPC content | | weight ppm | 25 | 24 | 25 | 21 | 26 | 21 | 24 |
| | Concentration of terminal phenyl groups | | μeq/g | 81 | 80 | 60 | 54 | 106 | 88 | 60 |
| | A/(A + B) | | mol/mol | 0.007 | 0.006 | 0.005 | 0.005 | 0.009 | 0.008 | 0.005 |
| Molded article | Light transmittance at 350 nm | | % | 78 | 67 | 75 | 80 | 74 | 70 | 70 |
| | Light transmittance at 320 nm | | % | 58 | 46 | 54 | 60 | 50 | 46 | 50 |
| | L* value | | — | 96.9 | 96.5 | 96.7 | 97.0 | 96.7 | 96.5 | 96.5 |
| | YI | | — | 3.2 | 4.4 | 4.1 | 3.0 | 4.2 | 5.5 | 5.1 |
| | YI value after metal halide lamp irradiation | | — | 5.2 | 6.5 | 7.0 | 4.7 | 7.4 | 9.0 | 8.5 |
| | Difference in YI value between before and after metal halide lamp irradiation | | — | 2.0 | 2.1 | 2.9 | 1.7 | 3.2 | 3.5 | 3.4 |
| | YI value after high-temperature residence test | | — | 3.8 | 4.9 | 4.6 | 3.4 | 4.8 | 6.4 | 5.6 |

| | | | | Example | | | Comparative Example | | | |
|---|---|---|---|---|---|---|---|---|---|---|
| | | | | 1-8 | 1-9 | 1-10 | 1-1 | 1-2 | 1-3 | 1-4 |
| Amount of catalyst used (metal amount) | | Mg | μmol per mol of dihydroxy compounds | — | — | — | — | — | — | — |
| | | Ca | | 2.5 | 2.5 | — | — | 2.5 | 2.5 | — |
| | | Ba | | — | — | — | — | — | — | — |
| | | Li | | — | — | — | — | — | — | — |
| | | Cs | | — | — | 2.5 | 2.5 | — | — | 1.0 |
| Polycarbonate resin | Proportion of structural units derived from each dihydroxy compound | ISB | mol % | 70.0 | 70.1 | 70.5 | 71.1 | 70.0 | 70.0 | 70.3 |
| | | CHDM | | 30.0 | 29.9 | 29.5 | 28.9 | 20.0 | 30.0 | 29.7 |
| | | DEG | | 30.0 | 0.0 | 0.0 | 0.0 | 0.0 | 0.0 | 0.0 |
| | | BPA | | 0.0 | 0.0 | 0.0 | 0.0 | 10.0 | 0.0 | 0.0 |
| | Concentration of Na, K, and Cs (total) | | weight ppm | 0.3 | 0.6 | 2.5 | 2.5 | 0.2 | 0.6 | 1.1 |
| | Concentration of Li | | weight ppm | <0.05 | <0.05 | <0.05 | <0.05 | <0.05 | <0.05 | <0.05 |
| | Reduced viscosity | | dL/g | 0.62 | 0.48 | 0.48 | 0.48 | 0.45 | 0.53 | 0.51 |
| | Phenol content | | weight ppm | 210 | 2390 | 245 | 221 | 201 | 185 | 239 |
| | DPC content | | weight ppm | 21 | 44 | 25 | 30 | 175 | 20 | 24 |
| | Concentration of terminal phenyl groups | | μeq/g | 50 | 66 | 85 | 118 | 100 | 69 | 50 |
| | A/(A + B) | | mol/mol | 0.005 | 0.008 | 0.008 | 0.011 | 0.131 | 0.006 | 0.005 |
| Molded article | Light transmittance at 350 nm | | % | 72 | 68 | 60 | 53 | 35 | 50 | 45 |
| | Light transmittance at 320 nm | | % | 51 | 37 | 33 | 22 | 0 | 16 | 12 |
| | L* value | | — | 96.7 | 96.4 | 96.3 | 96.2 | 95.5 | 96.2 | 96.0 |
| | YI | | — | 4.5 | 5.9 | 7.5 | 8.0 | 12.0 | 9.0 | 9.6 |
| | YI value after metal halide lamp irradiation | | — | 7.6 | 10.2 | 12.5 | 14.1 | 37.5 | 16.2 | 10.5 |
| | Difference in YI value between before and after metal halide lamp irradiation | | — | 3.1 | 4.3 | 5.0 | 6.1 | 25.5 | 7.2 | 0.9 |
| | YI value after high-temperature residence test | | — | 5.2 | 6.5 | 7.4 | 8.8 | 15.5 | 10.3 | 9.0 |

Note
A: number of moles of H bonded to aromatic rings of polycarbonate resin
B: number of moles of H bonded to parts other than aromatic rings in polycarbonate resin

Example 2

Example 2-1

ISB, CHDM, DPC which had been purified by distillation to reduce the chloride ion concentration thereof to 10 ppb or less, and calcium acetate monohydrate were introduced in an ISB/CHDM/DPC/calcium acetate monohydrate molar ratio of $0.70/0.30/1.00/1.3\times10^{-6}$ into a polymerization reactor equipped with a stirrer and a reflux condenser regulated to 100° C. Nitrogen displacement was sufficiently conducted (oxygen concentration, 0.0005-0.001 vol %). Subsequently, the contents were heated with a heat medium, and stirring was initiated at the time when the internal temperature reached 100° C. The contents were melted and homogenized while regulating the internal temperature to 100° C. Thereafter, heating was initiated, and the internal temperature was elevated to 210° C. over 40 minutes. At the time when the internal temperature reached 210° C., the polymerization reactor was regulated so as to maintain this temperature and pressure reduction was initiated simultaneously. The internal pressure was reduced to 13.3 kPa (absolute pressure; the same applies hereinafter) over 90 minutes from the time when 210° C. had been reached. The contents were held for further 60 minutes while maintaining that pressure. The phenol vapor which generated as a by-product with the progress of the polymerization reaction was introduced into the reflux condenser, in which steam regulated so as to have a temperature of 100° C. as measured at the inlet of the reflux condenser was used as a coolant. The monomer ingredients contained in a slight amount in the phenol vapor were returned to the polymerization reactor, and the phenol vapor, which remained uncondensed, was subsequently introduced into a condenser employing 45° C. warm water as a coolant and recovered.

After the internal pressure was temporarily returned to atmospheric pressure, the contents, which had been thus oligomerized, were transferred to another polymerization reactor equipped with a stirrer and a reflux condenser regulated in the same manner as described above. Heating and pressure reduction were initiated, and the internal temperature was elevated to 220° C. and the pressure was reduced to 200 Pa, over 60 minutes. Thereafter, the internal temperature was elevated to 228° C. and the pressure was reduced to 133 Pa or below, over 20 minutes. At the time when a given stirring power was reached, the pressure was returned to atmospheric pressure. The contents were discharged in the form of a strand and pelletized with a rotary cutter.

Using a twin-screw extruder having two vent holes (LABOTEX30HSS-32) manufactured by The Japan Steel Works, Ltd., the pellets obtained were extruded into a strand form while regulating the outlet resin temperature to 250° C. The extrudate was cooled and solidified with water, and then pelletized with a rotary cutter. In this operation, the vent holes were connected to a vacuum pump, and the pressure as measured at the vent holes was regulated to 500 Pa. The results of analysis of the polycarbonate resin obtained and the results of evaluation thereof conducted by the methods described above are shown in Table 2. The polycarbonate resin obtained had low yellowness, excellent lightness, and a satisfactory color tone. This resin further had satisfactory light resistance.

Example 2-2

The same procedure as in Example 2-1 was conducted, except that the molar proportions of ISB and CHDM were changed. As in Example 2-1, a polycarbonate resin which had low yellowness, excellent lightness, and a satisfactory color tone and which further had satisfactory light resistance was obtained.

Example 2-3

The same procedure as in Example 2-1 was conducted, except that ISB, CHDM, DPC, and calcium acetate monohydrate were introduced in an ISB/CHDM/DPC/calcium acetate monohydrate molar ratio of $0.70/0.30/1.00/2.5\times10^{-6}$. As in Example 2-1, a polycarbonate resin which had low yellowness, excellent lightness, and a satisfactory color tone and which further had satisfactory light resistance was obtained.

Example 2-4

The same procedure as in Example 2-1 was conducted, except that ISB, CHDM, DPC, and calcium acetate monohydrate were introduced in an ISB/CHDM/DPC/calcium acetate monohydrate molar ratio of $0.70/0.30/1.00/0.9\times10^{-6}$. A polycarbonate resin which had lower yellowness, higher lightness, and a better color tone than in Example 2-1 was obtained. This resin further had satisfactory light resistance.

Example 2-5

The same procedure as in Example 2-3 was conducted, except that magnesium acetate tetrahydrate was used in place of the calcium acetate monohydrate. As in Example 2-3, a polycarbonate resin which had low yellowness, excellent lightness, and a satisfactory color tone and which further had satisfactory light resistance was obtained.

Example 2-6

The same procedure as in Example 2-3 was conducted, except that barium acetate was used in place of the calcium acetate monohydrate. As in Example 2-3, a polycarbonate resin which had low yellowness, excellent lightness, and a satisfactory color tone and which further had satisfactory light resistance was obtained.

Example 2-7

The same procedure as in Example 2-3 was conducted, except that lithium acetate was used in place of the calcium acetate monohydrate. As in Example 2-3, a polycarbonate resin which had low yellowness, excellent lightness, and a satisfactory color tone and which further had satisfactory light resistance was obtained.

Example 2-8

The same procedure as in Example 2-3 was conducted, except that DEG was used in place of the CHDM. As in Example 2-3, a polycarbonate resin which had low yellowness, excellent lightness, and a satisfactory color tone and which further had satisfactory light resistance was obtained.

Example 2-9

The same procedure as in Example 2-3 was conducted, except that the evacuation through the vent holes of the extruder was omitted. The polycarbonate resin obtained had a slightly lower ultraviolet transmittance than in Example 2-3.

Example 2-10

The same procedure as in Example 2-3 was conducted, except that cesium carbonate was introduced in place of the calcium acetate monohydrate in the amount shown in Table 2 and that the temperature in the final stage of the polymerization was changed to 250° C. The polycarbonate resin obtained had slightly lower light resistance than in Example 2-3.

Comparative Example 2-1

The same procedure as in Example 2-3 was conducted, except that cesium carbonate was used in place of the calcium acetate monohydrate and that the final temperature in the polymerization was changed to 230° C. The polycarbonate resin obtained had a lower ultraviolet transmittance, a higher YI value, and lower lightness and light resistance than in Example 2-3.

Comparative Example 2-2

The same procedure as in Example 2-3 was conducted, except that ISB, CHDM, BPA, DPC, and calcium acetate monohydrate were introduced in an ISB/CHDM/BPA/DPC/calcium acetate monohydrate molar ratio of 0.70/0.20/0.10/1.00/2.5×10$^{-6}$ and that the final temperature in the polymerization was changed to 230° C. The polycarbonate resin obtained had a lower ultraviolet transmittance, a higher YI value, and lower lightness and light resistance than in Example 2-3.

Comparative Example 2-3

The same procedure as in Example 2-3 was conducted, except that the temperature in the final stage of the polymerization was changed to 260° C. The polycarbonate resin obtained had a lower ultraviolet transmittance, a higher YI value, and lower lightness and light resistance than in Example 2-3.

Comparative Example 2-4

The same procedure as in Example 2-3 was conducted, except that cesium carbonate was used in place of the calcium acetate monohydrate and that the temperature in the final stage of the polymerization was changed to 226° C. The polycarbonate resin obtained had lower light resistance than in Example 2-3.

TABLE 2

| | | | | Example | | | | | | |
|---|---|---|---|---|---|---|---|---|---|---|
| | | | | 2-1 | 2-2 | 2-3 | 2-4 | 2-5 | 2-6 | 2-7 |
| Amount of catalyst used (metal amount) | | Mg | μmol per mol of dihydroxy compounds | — | — | — | — | 2.5 | — | — |
| | | Ca | | 1.3 | 1.3 | 2.5 | 0.9 | — | — | — |
| | | Ba | | — | — | — | — | — | 2.5 | — |
| | | Li | | — | — | — | — | — | — | 2.5 |
| | | Cs | | — | — | — | — | — | — | — |
| Polycarbonate resin | Proportion of structural units derived from each dihydroxy compound | ISB | mol % | 69.9 | 50.0 | 70.0 | 70.0 | 69.9 | 70.0 | 69.9 |
| | | CHDM | | 30.1 | 50.0 | 30.0 | 30.0 | 30.1 | 30.0 | 30.1 |
| | | DEG | | 0.0 | 0.0 | 0.0 | 0.0 | 0.0 | 0 | 0.0 |
| | | BPA | | 0.0 | 0.0 | 0.0 | 0.0 | 0.0 | 0.0 | 0.0 |
| | Concentration of Na, K, and Cs (total) | | weight ppm | 0.6 | 0.8 | 0.6 | 0.6 | 0.6 | 0.6 | 0.6 |
| | Concentration of Li | | weight ppm | <0.05 | <0.05 | <0.05 | <0.05 | <0.05 | <0.05 | 0.13 |
| | Reduced viscosity | | dL/g | 0.48 | 0.59 | 0.51 | 0.51 | 0.49 | 0.46 | 0.50 |
| | Phenol content | | weight ppm | 222 | 220 | 230 | 200 | 223 | 221 | 210 |
| | DPC content | | weight ppm | 22 | 22 | 24 | 28 | 28 | 24 | 25 |
| | Concentration of terminal phenyl groups | | μeq/g | 75 | 76 | 57 | 60 | 111 | 90 | 58 |
| | A/(A + B) | | mol/mol | 0.007 | 0.006 | 0.005 | 0.005 | 0.010 | 0.008 | 0.005 |
| Molded article | Light transmittance at 350 nm | | % | 80 | 70 | 77 | 82 | 75 | 73 | 75 |
| | Light transmittance at 320 nm | | % | 60 | 49 | 57 | 63 | 52 | 50 | 57 |
| | L* value | | — | 97.0 | 96.6 | 96.8 | 97.2 | 96.7 | 96.6 | 96.7 |
| | YI | | — | 3.1 | 4.2 | 3.9 | 2.8 | 4.1 | 5.2 | 4.9 |
| | YI value after metal halide lamp irradiation | | — | 5.0 | 6.4 | 6.7 | 4.5 | 7.3 | 8.5 | 8.2 |
| | Difference in YI value between before and after metal halide lamp irradiation | | — | 1.9 | 2.2 | 2.8 | 1.7 | 3.2 | 3.3 | 3.3 |
| | YI value after high-temperature residence test | | — | 3.8 | 4.7 | 4.5 | 3.3 | 4.5 | 6.4 | 5.5 |

| | | | | Example | | | Comparative Example | | | |
|---|---|---|---|---|---|---|---|---|---|---|
| | | | | 2-8 | 2-9 | 2-10 | 2-1 | 2-2 | 2-3 | 2-4 |
| Amount of catalyst used (metal amount) | | Mg | μmol per mol of dihydroxy compounds | — | — | — | — | — | — | — |
| | | Ca | | 2.5 | 2.5 | — | — | 2.5 | 2.5 | — |
| | | Ba | | — | — | — | — | — | — | — |
| | | Li | | — | — | — | — | — | — | — |
| | | Cs | | — | — | 1.0 | 2.5 | — | — | 2.5 |
| Polycarbonate resin | Proportion of structural units derived from each dihydroxy compound | ISB | mol % | 70.0 | 71.1 | 70.3 | 71.1 | 70.0 | 70.0 | 70.5 |
| | | CHDM | | 0.0 | 28.9 | 29.7 | 28.9 | 20.0 | 30.0 | 29.5 |
| | | DEG | | 30.0 | 0.0 | 0.0 | 0.0 | 0.0 | 0.0 | 0.0 |
| | | BPA | | 0.0 | 0.0 | 0.0 | 0.0 | 10.0 | 0.0 | 0.0 |

TABLE 2-continued

|  |  |  |  |  |  |  |  |  |  |
|---|---|---|---|---|---|---|---|---|---|
|  | Concentration of Na, K, and Cs (total) | weight ppm | 0.3 | 0.6 | 1.1 | 2.5 | 0.2 | 0.6 | 2.5 |
|  | Concentration of Li | weight ppm | <0.05 | <0.05 | <0.05 | <0.05 | <0.05 | <0.05 | <0.05 |
|  | Reduced viscosity | dL/g | 0.61 | 0.49 | 0.51 | 0.48 | 0.45 | 0.53 | 0.48 |
|  | Phenol content | weight ppm | 210 | 2910 | 238 | 221 | 201 | 185 | 245 |
|  | DPC content | weight ppm | 23 | 43 | 24 | 30 | 175 | 20 | 25 |
|  | Concentration of terminal phenyl groups | μeq/g | 60 | 60 | 50 | 118 | 100 | 69 | 85 |
|  | A/(A + B) | mol/mol | 0.006 | 0.008 | 0.005 | 0.011 | 0.090 | 0.006 | 0.008 |
| Molded article | Light transmittance at 350 nm | % | 77 | 69 | 45 | 53 | 40 | 50 | 60 |
|  | Light transmittance at 320 nm | % | 58 | 40 | 12 | 22 | 0 | 16 | 33 |
|  | L* value | — | 96.9 | 96.5 | 96.0 | 96.2 | 95.8 | 96.2 | 96.3 |
|  | YI | — | 4.1 | 5.7 | 9.6 | 8.0 | 11.0 | 9.0 | 7.5 |
|  | YI value after metal halide lamp irradiation | — | 7.3 | 10.4 | 10.5 | 14.1 | 33.5 | 16.2 | 12.5 |
|  | Difference in YI value between before and after metal halide lamp irradiation | — | 3.2 | 4.7 | 0.9 | 5.1 | 22.5 | 7.2 | 5.0 |
|  | YI value after high-temperature residence test | — | 5.0 | 6.7 | 9.0 | 8.8 | 15.0 | 10.3 | 7.4 |

Note
A: number of moles of H bonded to aromatic rings of polycarbonate resin
B: number of moles of H bonded to parts other than aromatic rings in polycarbonate resin

Example 3

Example 3-1

ISB, CHDM, DPC which had been purified by distillation to reduce the chloride ion concentration thereof to 10 ppb or less, and calcium acetate monohydrate were introduced in an ISB/CHDM/DPC/calcium acetate monohydrate molar ratio of $0.70/0.30/1.00/1.3\times10^{-6}$ into a polymerization reactor equipped with a stirrer and a reflux condenser regulated to 100° C. Nitrogen displacement was sufficiently conducted (oxygen concentration, 0.0005-0.001 vol %). Subsequently, the contents were heated with a heat medium, and stirring was initiated at the time when the internal temperature reached 100° C. The contents were melted and homogenized while regulating the internal temperature to 100° C. Thereafter, heating was initiated, and the internal temperature was elevated to 215° C. over 40 minutes. At the time when the internal temperature reached 215° C., the polymerization reactor was regulated so as to maintain this temperature and pressure reduction was initiated simultaneously. The internal pressure was reduced to 13.3 kPa (absolute pressure; the same applies hereinafter) over 90 minutes from the time when 215° C. had been reached. The contents were held for further 60 minutes while maintaining that pressure. The phenol vapor which generated as a by-product with the progress of the polymerization reaction was introduced into the reflux condenser, in which steam regulated so as to have a temperature of 100° C. as measured at the inlet of the reflux condenser was used as a coolant. The monomer ingredients contained in a slight amount in the phenol vapor were returned to the polymerization reactor, and the phenol vapor, which remained uncondensed, was subsequently introduced into a condenser employing 45° C. warm water as a coolant and recovered.

After the internal pressure was temporarily returned to atmospheric pressure, the contents, which had been thus oligomerized, were transferred to another polymerization reactor equipped with a stirrer and a reflux condenser regulated in the same manner as described above. Heating and pressure reduction were initiated, and the internal temperature was elevated to 220° C. and the pressure was reduced to 200 Pa, over 60 minutes. Thereafter, the internal temperature was elevated to 230° C. and the pressure was reduced to 133 Pa or below, over 20 minutes. At the time when a given stirring power was reached, the pressure was returned to atmospheric pressure. The contents were discharged in the form of a strand and pelletized with a rotary cutter.

Using a twin-screw extruder having two vent holes (LABOTEX30HSS-32) manufactured by The Japan Steel Works, Ltd., the pellets obtained were extruded into a strand form while regulating the outlet resin temperature to 250° C. The extrudate was cooled and solidified with water, and then pelletized with a rotary cutter. In this operation, the vent holes were connected to a vacuum pump, and the pressure as measured at the vent holes was regulated to 500 Pa. The results of analysis of the polycarbonate resin obtained and the results of evaluation thereof conducted by the methods described above are shown in Table 3. The polycarbonate resin obtained had low yellowness, excellent lightness, and a satisfactory color tone. This resin further had satisfactory light resistance.

Example 3-2

The same procedure as in Example 3-1 was conducted, except that the molar proportions of ISB and CHDM were changed. As in Example 3-1, a polycarbonate resin which had low yellowness, excellent lightness, and a satisfactory color tone and which further had satisfactory light resistance was obtained.

Example 3-3

The same procedure as in Example 3-1 was conducted, except that ISB, CHDM, DPC, and calcium acetate monohydrate were introduced in an ISB/CHDM/DPC/calcium acetate monohydrate molar ratio of $0.70/0.30/1.00/2.5\times10^{-6}$. As in Example 3-1, a polycarbonate resin which had low yellowness, excellent lightness, and a satisfactory color tone and which further had satisfactory light resistance was obtained.

Example 3-4

The same procedure as in Example 3-1 was conducted, except that ISB, CHDM, DPC, and calcium acetate monohydrate were introduced in an ISB/CHDM/DPC/calcium acetate monohydrate molar ratio of 0.70/0.30/1.00/0.9×10⁻⁶. A polycarbonate resin which had lower yellowness, higher lightness, and a better color tone than in Example 3-1 was obtained. This resin further had satisfactory light resistance.

Example 3-5

The same procedure as in Example 3-3 was conducted, except that magnesium acetate tetrahydrate was used in place of the calcium acetate monohydrate. As in Example 3-3, a polycarbonate resin which had low yellowness, excellent lightness, and a satisfactory color tone and which further had satisfactory light resistance was obtained.

Example 3-6

The same procedure as in Example 3-3 was conducted, except that barium acetate was used in place of the calcium acetate monohydrate. As in Example 3-3, a polycarbonate resin which had low yellowness, excellent lightness, and a satisfactory color tone and which further had satisfactory light resistance was obtained.

Example 3-7

The same procedure as in Example 3-3 was conducted, except that lithium acetate was used in place of the calcium acetate monohydrate. As in Example 3-3, a polycarbonate resin which had low yellowness, excellent lightness, and a satisfactory color tone and which further had satisfactory light resistance was obtained.

Example 3-8

The same procedure as in Example 3-3 was conducted, except that DEG was used in place of the CHDM. As in Example 3-3, a polycarbonate resin which had low yellowness, excellent lightness, and a satisfactory color tone and which further had satisfactory light resistance was obtained.

Example 3-9

The procedure in Example 3-1 was conducted in which the set value of final stirring power for polymerization was lowered. Thus, polycarbonate resin pellets having a reduced viscosity of 0.40 dL/g and a phenol content of 3,500 weight ppm were obtained. In a nitrogen atmosphere, the polycarbonate resin pellets were melted with a single-screw extruder having a barrel temperature set at 230° C., and the melt was introduced into a horizontal reactor having two stirring shafts extending horizontally and a plurality of stirring blades discontinuously disposed on each shaft (manufactured by Hitachi Plant Technologies, Ltd.; spectacle-shaped blades; effective capacity, 6 L). The horizontal reactor was regulated so as to have an internal pressure of 133 Pa and an internal temperature of 230° C., and a polycondensation reaction was continuously performed for 60 minutes. The molten polycarbonate resin was discharged in the form of a strand and pelletized with a rotary cutter. The polycarbonate resin obtained had a reduced viscosity of 0.50 dL/g and a phenol concentration of 204 weight ppm.

Comparative Example 3-1

The same procedure as in Example 3-1 was conducted, except that cesium carbonate was used in place of the calcium acetate monohydrate. The resultant polycarbonate resin tended to have a lower ultraviolet transmittance and a higher initial YI value than in Example 3-1. This resin further had lower lightness and light resistance.

Comparative Example 3-2

The same procedure as in Comparative Example 3-1 was conducted, except that the evacuation through the vent holes of the extruder was omitted. The polycarbonate resin obtained had a lower ultraviolet transmittance, a higher initial YI value, and lower lightness and light resistance than in Comparative Example 3-1.

Comparative Example 3-3

The same procedure as in Example 3-1 was conducted, except that the amount of the calcium acetate monohydrate was increased as shown in Table 3. The polycarbonate resin obtained had a lower ultraviolet transmittance, a higher initial YI value, and lower lightness and light resistance than in Example 3-1.

Comparative Example 3-4

The same procedure as in Example 3-3 was conducted, except that the temperature in the final stage of the polymerization was changed to 260° C. and that the evacuation through the vent holes of the extruder was omitted. The polycarbonate resin obtained had a lower ultraviolet transmittance, a higher initial YI value, and lower lightness and light resistance than in Example 3-3.

TABLE 3

| | | | | Example | | | | | | |
| --- | --- | --- | --- | --- | --- | --- | --- | --- | --- | --- |
| | | | | 3-1 | 3-2 | 3-3 | 3-4 | 3-5 | 3-6 | 3-7 |
| Amount of catalyst used (metal amount) | | Mg | μmol per mol of dihydroxy compounds | — | — | — | — | 2.5 | — | — |
| | | Ca | | 1.3 | 1.3 | 2.5 | 0.9 | — | — | — |
| | | Ba | | — | — | — | — | — | 2.5 | — |
| | | Li | | — | — | — | — | — | — | 2.5 |
| | | Cs | | — | — | — | — | — | — | — |
| Polycarbonate resin | Proportion of structural units derived from each dihydroxy compound | ISB | mol % | 69.9 | 50.0 | 70.0 | 70.2 | 70.0 | 70.0 | 70.0 |
| | | CHDM | | 30.1 | 50.0 | 30.0 | 29.8 | 30.0 | 30.0 | 30.0 |
| | | DEG | | 0.0 | 0.0 | 0.0 | 0.0 | 0.0 | 0.0 | 0.0 |
| | | BPA | | 0.0 | 0.0 | 0.0 | 0.0 | 0.0 | 0.0 | 0.0 |
| | Concentration of Na, K, and Cs (total) | | weight ppm | 0.6 | 0.8 | 0.6 | 0.6 | 0.6 | 0.6 | 0.6 |
| | Concentration of Li | | weight ppm | <0.05 | <0.05 | <0.05 | <0.05 | <0.05 | <0.05 | 0.13 |
| | Reduced viscosity | | dL/g | 0.48 | 0.60 | 0.50 | 0.51 | 0.48 | 0.48 | 0.50 |
| | Phenol content | | weight ppm | 205 | 230 | 220 | 222 | 232 | 230 | 205 |

TABLE 3-continued

|  |  |  |  |  |  |  |  |  |
|---|---|---|---|---|---|---|---|---|
|  | DPC content | weight ppm | 26 | 25 | 25 | 24 | 28 | 21 | 26 |
|  | Concentration of terminal phenyl groups | μeq/g | 75 | 77 | 58 | 50 | 100 | 84 | 52 |
|  | A/(A + B) | mol/mol | 0.007 | 0.006 | 0.005 | 0.005 | 0.009 | 0.008 | 0.005 |
| Molded article | Light transmittance at 350 nm | % | 77 | 67 | 73 | 80 | 72 | 69 | 70 |
|  | Light transmittance at 320 nm | % | 57 | 45 | 51 | 59 | 50 | 46 | 50 |
|  | L* value | — | 96.9 | 96.4 | 96.6 | 97.0 | 96.7 | 96.5 | 96.5 |
|  | Initial YI value | — | 3.3 | 4.6 | 4.3 | 3.1 | 4.4 | 5.7 | 5.2 |
|  | YI value after metal halide lamp irradiation | — | 5.4 | 6.7 | 7.1 | 4.7 | 7.5 | 9.0 | 8.5 |
|  | Difference in YI value between before and after metal halide lamp irradiation | — | 2.1 | 2.1 | 2.8 | 1.6 | 3.1 | 3.3 | 3.3 |
|  | YI value after high-temperature residence test | — | 3.9 | 4.9 | 4.6 | 3.5 | 4.8 | 6.4 | 5.8 |

|  |  |  |  | Example | | Comparative Example | | | |
|---|---|---|---|---|---|---|---|---|---|
|  |  |  |  | 3-8 | 3-9 | 3-1 | 3-2 | 3-3 | 3-4 |
| Amount of catalyst used (metal amount) |  | Mg | μmol per mol of dihydroxy compounds | — | — | — | — | — | — |
|  |  | Ca |  | 2.5 | 1.3 | — | — | 25.0 | 2.5 |
|  |  | Ba |  | — | — | — | — | — | — |
|  |  | Li |  | — | — | — | — | — | — |
|  |  | Cs |  | — | — | 1.3 | 1.3 | — | — |
| Polycarbonate resin | Proportion of structural units derived from each dihydroxy compound | ISB | mol % | 70.0 | 70.0 | 71.1 | 71.1 | 70.0 | 70.0 |
|  |  | CHDM |  | 0.0 | 30.0 | 28.9 | 28.9 | 30.0 | 30.0 |
|  |  | DEG |  | 30.0 | 0.0 | 0.0 | 0.0 | 0.0 | 0.0 |
|  |  | BPA |  | 0.0 | 0.0 | 0.0 | 0.0 | 0.0 | 0.0 |
|  | Concentration of Na, K, and Cs (total) |  | weight ppm | 0.3 | 0.6 | 1.5 | 1.5 | 0.6 | 0.6 |
|  | Concentration of Li |  | weight ppm | <0.05 | <0.05 | <0.05 | <0.05 | <0.05 | <0.05 |
|  | Reduced viscosity |  | dL/g | 0.63 | 0.50 | 0.50 | 0.50 | 0.51 | 0.53 |
|  | Phenol content |  | weight ppm | 210 | 204 | 209 | 2220 | 250 | 2550 |
|  | DPC content |  | weight ppm | 20 | 8 | 24 | 45 | 25 | 45 |
|  | Concentration of terminal phenyl groups |  | μeq/g | 50 | 50 | 90 | 95 | 110 | 60 |
|  | A/(A + B) |  | mol/mol | 0.005 | 0.005 | 0.008 | 0.010 | 0.010 | 0.008 |
| Molded article | Light transmittance at 350 nm |  | % | 71 | 81 | 60 | 50 | 44 | 47 |
|  | Light transmittance at 320 nm |  | % | 50 | 60 | 30 | 24 | 0 | 13 |
|  | L* value |  | — | 96.6 | 97.0 | 96.4 | 96.0 | 95.0 | 95.9 |
|  | Initial YI value |  | — | 4.7 | 2.9 | 7.0 | 8.0 | 12.5 | 10.7 |
|  | YI value after metal halide lamp irradiation |  | — | 7.8 | 4.4 | 12.0 | 13.5 | 20.9 | 18.3 |
|  | Difference in YI value between before and after metal halide lamp irradiation |  | — | 3.1 | 1.5 | 5.0 | 5.5 | 8.4 | 7.6 |
|  | YI value after high-temperature residence test |  | — | 5.3 | 3.4 | 8.0 | 9.2 | 15.1 | 14.5 |

Example 4

In the following, properties of polycarbonates were evaluated by the following methods.

(1) Measurement of Oxygen Concentration

The concentration of oxygen in a polymerization reactor was measured with an oxygen analyzer (1000RS, manufactured by AMI Inc.).

(2) Determination of Amounts of Monomers and Phenol Distilled Off

The weights of the monomers and phenol which were distilled off in each reaction stage were determined from a composition determined by liquid chromatography.

(3) Calculation of Proportion (% by Weight) of Total Amount of Monomers Distilled Off to Sum of Starting-Material Monomers The proportion of the total amount of all monomers distilled off to the sum of starting-material monomers was calculated from the total amount of all the monomers distilled off including diphenyl carbonate which was determined in (2) above and from the sum of all the monomers fed as the starting-materials.

(4) Measurement of Reduced Viscosity

A sample of a polycarbonate resin was dissolved using methylene chloride as a solvent to prepare a polycarbonate solution having a concentration of 0.6 g/dL. Using a Ubbelohde viscometer manufactured by Moritomo Rika Kogyo, a measurement was made at a temperature of 20.0±0.1° C. The relative viscosity $\eta rel$ was determined from the flow-down time of the solvent $t_0$ and the flow-down time of the solution t using the following equation.

$$\eta rel = t/t_0$$

The specific viscosity $\eta sp$ was determined from the relative viscosity using the following equation.

$$\eta sp = (\eta - \eta_0)/\eta_0 = \eta rel - 1$$

The specific viscosity was divided by the concentration c (g/dL) to determine the reduced viscosity $\eta sp/c$. The larger the value thereof, the higher the molecular weight.

(5) Determination of Proportion of Structural Units Derived from Each Dihydroxy Compound in Polycarbonate Resin and Determination of Concentration of Terminal Phenyl Groups The proportion of structural units of each dihydroxy compound which were contained in a polycarbonate resin was determined in the following manner. Thirty milligrams of the polycarbonate resin was weighed out and dissolved in about 0.7 mL of chloroform-d to obtain a solution, and this solution was introduced into a tube for NMR spectroscopy which had an inner diameter of 5 mm. The solution was examined for $^1$H NMR spectrum at ordinary temperature using JNM-AL400 (resonance frequency, 400 MHz), manufactured by JEOL Ltd. The proportions of structural units derived from respective dihydroxy compounds were determined from an intensity ratio among signals attributable to the structural units derived from the respective dihydroxy compounds.

With respect to the concentration of terminal phenyl groups, the polycarbonate resin was examined for $^1$H NMR spectrum in the same manner as described above using 1,1,2,2-tetrabromoethane as an internal reference, and the concentration was determined from an intensity ratio between a signal attributable to the internal reference and a signal attributable to terminal phenyl groups.

(6) Difference Between Proportion of Each Dihydroxy Compound Fed as Starting Material and Proportion of Structural Units Derived from the Dihydroxy Compound in Polycarbonate Resin Obtained The title difference was evaluated from the absolute value of the result obtained by dividing the difference between the molar proportion in percentage of structural units of each dihydroxy compound in the polycarbonate resin which was determined in (5) above and the molar proportion in percentage of the dihydroxy compound fed as a starting material, by the molar proportion in percentage of the dihydroxy compound fed as a starting material. The lager the absolute value, the larger the title difference.

(7) Determination of Concentration of Metals in Polycarbonate Resin

About 0.5 g of polycarbonate resin pellets were precisely weighed out and put in a microwave decomposition vessel manufactured by PerkinElmer, Inc., and 2 mL of 97% sulfuric acid was added thereto. This vessel was closed and heated with a microwave at 230° C. for 10 minutes. After the vessel was cooled to room temperature, 1.5 mL of 68% nitric acid was added to the contents. This vessel was closed, heated with a microwave at 150° C. for 10 minutes, and then cooled again to room temperature. To the contents was added 2.5 mL of 68% nitric acid. This vessel was closed again and heated with a microwave at 230° C. for 10 minutes to completely decompose the contents. After the vessel was cooled to room temperature, the liquid thus obtained was diluted with pure water and the concentration of metals therein was determined with an ICP-MS apparatus manufactured by ThermoQuest Corp.

(8) Method for Evaluating Initial Hue of Polycarbonate Resin

Pellets of a polycarbonate resin were dried at 110° C. for 10 hours in a nitrogen atmosphere. Subsequently, the dried polycarbonate resin pellets were fed to an injection molding machine (Type J75EII, manufactured by The Japan Steel Works, Ltd.), and an operation for forming injection-molded pieces (60 mm (width)×60 mm (length)×3 mm (thickness)) was repeated under the conditions of a resin temperature of 220° C. and a molding cycle of 23 seconds. The injection-molded pieces obtained by the 10th shot to the 20th shot were examined for yellowness index (YI) value and L* value with respect to thickness-direction transmitted light using a color tester (CM-3700d, manufactured by Konica Minolta Inc.), and an average thereof was calculated. The smaller the YI value, the less the yellowness and the better the quality. The larger the L* value, the higher the lightness.

(9) Light Transmittance at Wavelengths of 350 nm and 320 nm

Injection-molded pieces (60 mm (width)×60 mm (length)×3 mm (thickness); 10th shot to 20th shot) obtained in (8) above were examined for thickness-direction light transmittance using a spectrophotometer for ultraviolet and visible regions (U2900, manufactured by Hitachi High-Technologies Corp.), and an average thereof was calculated to evaluate the light transmittance.

(10) Metal Halide Lamp Irradiation Test

Metaling Weather Meter M6T, manufactured by Suga Test Instruments Co., Ltd., was used. A horizontal Metaling Lamp and quartz were attached thereto as a light source and an inner filter, respectively, and a #500 filter was attached as an outer filter to the periphery of the lamp. The apparatus was set so as to result in an irradiance for wavelength range 300-400 nm of 1.5 kW/m$^2$, and a square surface of a flat plate (60 mm (width)×60 mm (length)×3 mm (thickness)) obtained by the 20th shot in (8) above was irradiated with light for 100 hours under the conditions of 63° C. and a relative humidity of 50%. After the irradiation, the flat plate was examined for YI value in the same manner as in (8) above.

The abbreviations for compounds used in the following Examples are as follows.

ISB: isosorbide (trade name, POLYSORB; manufactured by Roquette Freres)
CHDM: 1,4-cyclohexanedimethanol (trade name, SKY CHDM; manufactured by New Japan Chemical Co., Ltd.)
DEG: diethylene glycol (manufactured by Mitsubishi Chemical Corp.)
DPC: diphenyl carbonate (manufactured by Mitsubishi Chemical Corp.)

Example 4-1

First-Stage Reaction

Into a 40-L polymerization reactor equipped with a heating medium jacket employing an oil as a heating medium, a stirrer, and a distillate tube connected to a vacuum pump were introduced 30.44 mol of ISB, 13.04 mol of CHDM, and 43.48 mol of DPC which had been purified by distillation to reduce the chloride ion concentration thereof to 10 ppb or less. Calcium acetate monohydrate in the form of an aqueous solution was introduced in an amount of $1.25 \times 10^{-6}$ mol per mole of all dihydroxy compounds. Thereafter, nitrogen displacement was sufficiently conducted (oxygen concentration, 0.0005-0.001 vol %). The distillate tube was provided with a reflux condenser employing steam (inlet temperature, 100° C.) as a coolant and with a condenser which employed warm water (inlet temperature, 45° C.) as a coolant and was disposed downstream from the reflux condenser. Subsequently, the heated heating medium was passed through the reactor and, at the time when the temperature of the liquid reaction mixture (i.e., internal temperature) reached 100° C., stirring was initiated.

The contents were melted and homogenized while keeping the internal temperature at 100° C. Thereafter, heating was initiated, and the internal temperature was elevated to 220° C. over 40 minutes. At the time when the internal temperature reached 220° C., pressure reduction was initiated and the system was regulated so that the internal pressure decreased to 13.3 kPa (absolute pressure, the same applies hereinafter) over 90 minutes. Upon the initiation of pressure reduction, the vapor of phenol which had been generated by the reaction rapidly began to be distilled off. The temperature of the oil being introduced into the heating medium jacket (heating medium jacket inlet temperature) was suitably regulated so that the internal temperature was kept constant at 220° C. The temperature of the heating-medium oil was regulated to 242° C. during the period when phenol was distilled off in an increased amount, and was regulated so as to be lower than 242° C. during the other periods.

After the internal pressure was reduced to 13.3 kPa, the contents were held for further 60 minutes while maintaining that pressure. Thus, a polycarbonate oligomer was obtained.

The phenol which generated as a by-product of the polymerization reaction and the monomers which were distilled off were partly condensed by means of the reflux condenser and returned to the polymerization reactor. The phenol, which remained uncondensed, and the monomers which had not been condensed in the reflux condenser were introduced into the condenser and recovered. The phenol which was distilled off in this stage amounted to 94% of a theoretical distillation removal amount.

(Second-Stage Reaction)

In a nitrogen atmosphere, the polycarbonate oligomer obtained in the first stage was transferred to a polymerization reactor equipped with a heating medium jacket employing an oil as a heating medium, a stirrer, and a distillate tube connected to a vacuum pump. The distillate tube was provided with a reflux condenser employing steam (inlet temperature, 100° C.) as a coolant and with a condenser which employed warm water (inlet temperature, 45° C.) as a coolant and was disposed downstream from the reflux condenser. The distillate tube was further provided, downstream from the condenser, with a cold trap employing dry ice as a coolant.

After the transfer of the oligomer, pressure reduction was initiated, and the internal temperature was elevated to 220° C. and the pressure was reduced to 200 Pa, over 60 minutes. Thereafter, the internal temperature was elevated to 230° C. and the pressure was reduced to 133 Pa or below, over 20 minutes. At the time when a given stirring power was reached, the pressure was returned to atmospheric pressure. The contents were discharged in the form of a strand and pelletized with a rotary cutter. In this operation, the period from the time when the pressure became 1 kPa to the time when the given stirring power was reached was measured.

The phenol which generated as a by-product of the polymerization reaction and the monomers which were distilled off were partly condensed by means of the reflux condenser and returned to the polymerization reactor. The phenol, which remained uncondensed, and the monomers which had not been condensed in the reflux condenser were introduced into the condenser and recovered. Furthermore, the fraction which had not been condensed in the condenser was recovered with the cold trap disposed downstream from the condenser.

The fractions recovered through the reflux condenser, condenser, and cold trap in each reaction stage were weighed and examined for composition to determine the amounts of the by-product phenol and monomers which had been distilled off. The thus-determined weights of the monomers distilled off in the respective stages were summed up, and the ratio of the total to the amount of the monomers fed as starting materials was calculated and shown in Table 4.

Using a twin-screw extruder having two vent holes (LABOTEX30HSS-32) manufactured by The Japan Steel Works, Ltd., the pellets obtained were extruded into a strand form while regulating the outlet resin temperature to 250° C. The extrudate was cooled and solidified with water, and then pelletized with a rotary cutter. In this operation, the vent holes were connected to a vacuum pump, and the pressure as measured at the vent holes was regulated to 500 Pa.

The results of analysis of the polycarbonate resin obtained and the results of evaluation thereof conducted by the methods described above are shown in Table 4. The amount of the monomers distilled off was small, and the difference between the proportion of each dihydroxy compound fed as a starting material and the proportion of structural units of the dihydroxy compound in the polycarbonate resin obtained was small. A polycarbonate resin having low yellowness, excellent lightness, and a satisfactory color tone was obtained. The resin further had satisfactory light resistance.

Example 4-2

The same procedure as in Example 4-1 was conducted, except that the molar proportions of ISB and CHDM were changed and that the maximum temperature of the heat medium in the first-stage reaction was changed. As in Example 4-1, the amount of the monomers distilled off was small, and the difference between the proportion of each dihydroxy compound fed as a starting material and the proportion of structural units of the dihydroxy compound in the polycarbonate resin obtained was small. A polycarbonate resin which had low yellowness, excellent lightness, and a satisfactory color tone and which further had satisfactory light resistance was obtained as in Example 4-1.

Example 4-3

The same procedure as in Example 4-1 was conducted, except that calcium acetate monohydrate was introduced in an amount of $2.50 \times 10^{-6}$ mol per mole of all dihydroxy compounds and that the maximum temperature of the heat medium in the first-stage reaction was changed to 244° C. As in Example 4-1, the amount of the monomers distilled off was small, and the difference between the proportion of each dihydroxy compound fed as a starting material and the proportion of structural units of the dihydroxy compound in the polycarbonate resin obtained was small. A polycarbonate resin which had low yellowness, excellent lightness, and a satisfactory color tone and which further had satisfactory light resistance was obtained as in Example 4-1.

Example 4-4

The same procedure as in Example 4-1 was conducted, except that calcium acetate monohydrate was introduced in an amount of $0.90 \times 10^{-6}$ mol per mole of all dihydroxy compounds and that the maximum temperature of the heat medium in the first-stage reaction was changed to 239° C. As in Example 4-1, the amount of the monomers distilled off was small, and a polycarbonate resin was obtained in which the difference between the proportion of each dihydroxy compound fed as a starting material and the proportion of structural units of the dihydroxy compound in the polycarbonate resin obtained was small. This polycarbonate resin had lower yellowness, better lightness, and better light resistance than in Example 4-1.

Example 4-5

The same procedure as in Example 4-1 was conducted, except that calcium acetate monohydrate was introduced in an amount of $0.25 \times 10^{-6}$ mol per mole of all dihydroxy compounds and that the maximum temperature of the heat medium in the first-stage reaction was changed to 233° C. The rate of polymerization in the second stage was lower and the amount of the monomers distilled off was slightly larger, as compared with those in Example 4-1. However, a polycarbonate resin having low yellowness, excellent lightness, and a satisfactory color tone was obtained. This resin further had satisfactory light resistance.

Example 4-6

The same procedure as in Example 4-3 was conducted, except that magnesium acetate tetrahydrate was used in place of the calcium acetate monohydrate and that the maximum temperature of the heat medium in the first-stage reaction was changed. As in Example 4-3, the amount of the monomers distilled off was small, and the difference between the proportion of each dihydroxy compound fed as a starting material and the proportion of structural units of the dihydroxy compound in the polycarbonate resin obtained was small. A polycarbonate resin which had low yellowness, excellent lightness, and a satisfactory color tone and which further had satisfactory light resistance was obtained as in Example 4-3.

Example 4-7

The same procedure as in Example 4-3 was conducted, except that barium acetate was used in place of the calcium acetate monohydrate and that the maximum temperature of the heat medium in the first-stage reaction was changed. As in Example 4-3, the amount of the monomers distilled off was small, and the difference between the proportion of each dihydroxy compound fed as a starting material and the proportion of structural units of the dihydroxy compound in the polycarbonate resin obtained was small. A polycarbonate resin which had low yellowness, excellent lightness, and a satisfactory color tone and which further had satisfactory light resistance was obtained as in Example 4-3.

Example 4-8

The same procedure as in Example 4-3 was conducted, except that lithium acetate was used in place of the calcium acetate monohydrate and that the maximum temperature of the heat medium in the first-stage reaction was changed. As in Example 4-3, the amount of the monomers distilled off was small, and the difference between the proportion of each dihydroxy compound fed as a starting material and the proportion of structural units of the dihydroxy compound in the polycarbonate resin obtained was small. A polycarbonate resin which had low yellowness, excellent lightness, and a satisfactory color tone and which further had satisfactory light resistance was obtained as in Example 4-3.

Example 4-9

The same procedure as in Example 4-3 was conducted, except that DEG was used in place of the CHDM and that the maximum temperature of the heat medium in the first-stage reaction was changed. As in Example 4-3, the amount of the monomers distilled off was small, and the difference between the proportion of each dihydroxy compound fed as a starting material and the proportion of structural units of the dihydroxy compound in the polycarbonate resin obtained was small. A polycarbonate resin which had low yellowness, excellent lightness, and a satisfactory color tone and which further had satisfactory light resistance was obtained as in Example 4-3.

Example 4-10

The same procedure as in Example 4-3 was conducted, except that cesium carbonate was used in place of the calcium acetate monohydrate and that the maximum temperature of the heat medium in the first-stage reaction was changed. The amount of the monomers distilled off was slightly larger and the polymerization period was longer, as compared with those in Example 4-3. The difference between the proportion of each dihydroxy compound fed as a starting material and the proportion of structural units of the dihydroxy compound in the polycarbonate resin obtained was slightly larger than in Example 4-3.

Example 4-11

The same procedure as in Example 4-1 was conducted, except that calcium acetate monohydrate was introduced in an amount of $5.00 \times 10^{-6}$ mol per mole of all dihydroxy compounds and that the maximum temperature of the heat medium in the first-stage reaction was changed to 248° C. As in Example 4-1, the difference between the proportion of each dihydroxy compound fed as a starting material and the proportion of structural units of the dihydroxy compound in the polycarbonate resin obtained was small. However, slight coloration was observed.

Comparative Example 4-1

The same procedure as in Example 4-10 was conducted, except that in the first and second stages, the reflux condenser was bypassed and not used. In the second stage, the given power was not reached even when 180 minutes had passed since the pressure had become 1 kPa. The polymer hence was discharged. The amount of the monomers distilled off was large, and the difference between the proportion of each dihydroxy compound fed as a starting material and the proportion of structural units of the dihydroxy compound in the polycarbonate resin obtained was large. In addition, the polycarbonate resin obtained had enhanced yellowness and impaired light resistance.

Comparative Example 4-2

The same procedure as in Comparative Example 4-1 was conducted, except that the first stage was performed in the following manner. The starting-material mixture was evenly melted at 100° C., and the internal temperature was thereafter elevated to 220° C. over 60 minutes. Pressure reduction was initiated at the time when the internal temperature reached 220° C., and the system was regulated so that the pressure became 13.3 kPa over 120 minutes.

In the second stage, the given power was not reached even when 180 minutes had passed since the pressure had become 1 kPa. The polymer hence was discharged. Although smaller than in Comparative Example 4-1, the amount of the monomers distilled off was still large. In addition, the difference between the proportion of each dihydroxy compound fed as a starting material and the proportion of structural units of the dihydroxy compound in the polycarbonate resin obtained was large.

Comparative Example 4-3

The same procedure as in Example 4-1 was conducted, except that the first-stage reaction was performed by a method including evenly melting the starting-material mixture at 100° C., thereafter elevating the internal temperature to 250° C. over 40 minutes, initiating pressure reduction at the time when the internal temperature reached 250° C., and regulating the system so that the pressure became 13.3 kPa over 90 minutes, and that the maximum temperature of the heat medium in the first-stage reaction was changed to 275° C. In the second stage, the given power was not reached even when 180 minutes had passed since the pressure had become 1 kPa. The polymer hence was discharged. The amount of the monomers distilled off was large, and the difference between the proportion of each dihydroxy compound fed as a starting material and the proportion of structural units of the dihydroxy compound in the polycarbonate resin obtained was large. In addition, the polycarbonate resin obtained had too low a viscosity and was unable to be molded.

Reference Example

First-Stage Reaction

Into a polymerization reactor having a capacity of 0.5 L which was made of glass and equipped with a stirrer and a distillate tube connected to a vacuum pump were introduced 0.530 mol of ISB, 0.227 mol of CHDM, and 0.773 mol of DPC which had been purified by distillation to reduce the chloride ion concentration thereof to 10 ppb or less. Calcium acetate monohydrate in the form of an aqueous solution was introduced in an amount of $1.25 \times 10^{-6}$ mol per mole of all dihydroxy compounds. Thereafter, nitrogen displacement was sufficiently conducted. Subsequently, the reactor was immersed in an oil bath, and stirring was initiated at the time when the temperature of the liquid reaction mixture (often referred to as internal temperature) reached 100° C. The contents were melted and homogenized while keeping the internal temperature at 100° C. Thereafter, heating was initiated to elevate the internal temperature to 220° C. over 40 minutes. Pressure reduction was initiated at the time when the internal temperature reached 220° C., and the system was regulated so that the pressure became 13.3 kPa over 90 minutes. Upon the initiation of pressure reduction, the vapor of phenol which had been generated by the reaction rapidly began to be distilled off. The temperature of the oil bath was suitably regulated so that the internal temperature was kept constant at 220° C. The temperature of the oil bath was regulated to 224° C. during the period when phenol was distilled off in an increased amount, and was regulated so as to be lower than 224° C. during the other periods.

After the internal pressure was reduced to 13.3 kPa, the contents were held for further 60 minutes while maintaining that pressure. Thus, a polycarbonate oligomer was obtained.

The phenol which generated as a by-product of the polymerization reaction and the monomers which were distilled off were introduced into a condenser (inlet temperature of coolant, 45° C.) and recovered. The phenol which was distilled off in this stage amounted to 90% of a theoretical distillation removal amount.

(Second-Stage Reaction)

Subsequently, the oil bath was heated and pressure reduction was initiated. The internal temperature was elevated to 220° C. and the pressure was reduced to 200 Pa, over 60 minutes. Thereafter, the internal temperature was elevated to 230° C. and the pressure was reduced to 133 Pa or below, over 20 minutes. At the time when a given stirring power was reached, the pressure was returned to atmospheric pressure. The contents were discharged in the form of a strand. In this operation, the period from the time when the pressure became 1 kPa to the time when the given stirring power was reached was measured. The phenol which generated as a by-product of the polymerization reaction and the monomers which were distilled off were introduced into the condenser (inlet temperature of coolant, 45° C.) and recovered, as in the first-stage reaction. Furthermore, the fraction which had not been condensed in the condenser was recovered with a cold trap disposed downstream from the condenser.

The fractions recovered through the reflux condenser, condenser, and cold trap in each reaction stage were weighed and examined for composition to determine the amounts of the by-product phenol and monomers which had been distilled off. The thus-determined weights of the monomers distilled off in the respective stages were summed up, and the ratio of the total to the amount of the monomers fed as starting materials was calculated and shown in Table 4.

TABLE 4

|  |  |  |  | Example | | | | | | | |
|---|---|---|---|---|---|---|---|---|---|---|---|
|  |  |  |  | 4-1 | 4-2 | 4-3 | 4-4 | 4-5 | 4-6 | 4-7 | 4-8 |
| Starting materials | Amount of catalyst used (metal amount) | Mg | μmol per mol of dihydroxy compounds | — | — | — | — | — | 2.50 | — | — |
|  |  | Ca |  | 1.25 | 1.25 | 2.50 | 0.90 | 0.25 | — | — | — |
|  |  | Ba |  | — | — | — | — | — | — | 2.50 | — |
|  |  | Li |  | — | — | — | — | — | — | — | 2.50 |
|  |  | Cs |  | — | — | — | — | — | — | — | — |
|  | Monomers used | ISB | mol % | 70.0 | 50.0 | 70.0 | 70.0 | 70.0 | 70.0 | 70.0 | 70.0 |
|  |  | CHDM |  | 30.0 | 50.0 | 30.0 | 30.0 | 30.0 | 30.0 | 30.0 | 30.0 |
|  |  | DEG |  | — | — | — | — | — | — | — | — |
|  |  | DPC |  | 100.0 | 100.0 | 100.0 | 100.0 | 100.0 | 100.0 | 100.0 | 100.0 |
| Production conditions | Maximum temperature of heating medium in first stage |  | ° C. | 242 | 240 | 244 | 239 | 233 | 239 | 237 | 240 |
|  | Temperature of liquid reaction mixture (internal temperature) in first stage |  | ° C. | 220 | 220 | 220 | 220 | 220 | 220 | 220 | 220 |
|  | Difference between maximum heat medium temperature and internal temperature in first stage |  | ° C. | 22 | 20 | 24 | 19 | 13 | 19 | 17 | 20 |
|  | Temperature of coolant introduced into reflux condenser |  | ° C. | 100 | 100 | 100 | 100 | 100 | 100 | 100 | 100 |
|  | Period from 1 kPa to polymerization termination |  | min | 60 | 45 | 30 | 80 | 170 | 130 | 80 | 30 |

TABLE 4-continued

| Poly-carbonate resin | Molar proportion in percentage of structural units derived from each dihydroxy compound | ISB (a) | mol % | 70.0 | 50.7 | 70.0 | 70.0 | 71.0 | 70.0 | 70.0 | 69.9 |
|---|---|---|---|---|---|---|---|---|---|---|---|
| | | CHDM (b) | | 30.0 | 49.3 | 30.0 | 30.0 | 29.0 | 30.0 | 30.0 | 30.1 |
| | | DEG (c) | | — | — | — | — | — | — | — | — |
| | Difference of proportion of structural units of each dihydroxy compound | \|(a − A)/A\| | — | 0.000 | 0.014 | 0.000 | 0.000 | 0.014 | 0.000 | 0.000 | 0.001 |
| | | \|(b − B)/B\| | | 0.000 | 0.014 | 0.000 | 0.000 | 0.033 | 0.000 | 0.000 | 0.003 |
| | | \|(c − C)/C\| | | — | — | — | — | — | — | — | — |
| | Concentration of Na, K, and Cs (total) | | wt ppm | 0.6 | 0.8 | 0.6 | 0.6 | 0.6 | 0.6 | 0.6 | 0.6 |
| | Concentration of Li | | wt ppm | <0.05 | <0.05 | <0.05 | <0.05 | <0.05 | <0.05 | <0.05 | 0.13 |
| | (Amount of phenol distilled off in first stage)/(theoretical distillation removal amount) | | wt % | 94 | 96 | 96 | 92 | 85 | 94 | 93 | 93 |
| | (Total amount of monomers distilled off)/(sum of starting-material monomers) | | wt % | 0.6 | 1.1 | 0.4 | 1.0 | 1.5 | 0.5 | 0.7 | 0.4 |
| | Reduced viscosity | | dL/g | 0.49 | 0.60 | 0.51 | 0.50 | 0.48 | 0.49 | 0.50 | 0.49 |
| | Concentration of terminal phenyl groups | | µeq/g | 85 | 61 | 61 | 60 | 110 | 100 | 90 | 64 |
| Molded article | Light transmittance at 350 nm | | % | 76 | 65 | 71 | 79 | 67 | 71 | 65 | 70 |
| | Light transmittance at 320 nm | | % | 56 | 42 | 50 | 59 | 45 | 50 | 43 | 50 |
| | L* value | | — | 96.8 | 96.4 | 96.6 | 97.0 | 96.4 | 96.5 | 96.3 | 96.4 |
| | YI | | — | 3.5 | 4.6 | 4.2 | 3.0 | 4.0 | 4.5 | 5.5 | 5.0 |
| | YI value after metal halide lamp irradiation | | — | 5.4 | 6.6 | 7.0 | 4.8 | 5.7 | 7.6 | 9.0 | 8.0 |
| | Difference in YI value between before and after metal halide lamp irradiation | | — | 1.9 | 2.0 | 2.8 | 1.8 | 1.7 | 3.1 | 3.5 | 3.0 |

| | | | | Example | | | Comparative Example | | | Reference |
|---|---|---|---|---|---|---|---|---|---|---|
| | | | | 4-9 | 4-10 | 4-11 | 4-1 | 4-2 | 4-3 | Example |
| Starting materials | Amount of catalyst used (metal amount) | Mg | µmol per mol of dihydroxy compounds | — | — | — | — | — | — | — |
| | | Ca | | 2.50 | — | 5.00 | — | — | 1.25 | — |
| | | Ba | | — | — | — | — | — | — | — |
| | | Li | | — | — | — | — | — | — | — |
| | | Cs | | — | 2.50 | — | 2.50 | 2.50 | — | 2.50 |
| | Monomers used | ISB | mol % | 70.0 | 70.0 | 70.0 | 70.0 | 70.0 | 70.0 | 70.0 |
| | | CHDM | | — | 30.0 | 30.0 | 30.0 | 30.0 | 30.0 | 30.0 |
| | | DEG | | 30.0 | — | — | — | — | — | — |
| | | DPC | | 100.0 | 100.0 | 100.0 | 104.0 | 104.0 | 104.0 | 102.0 |
| Production conditions | Maximum temperature of heating medium in first stage | | ° C. | 250 | 238 | 248 | 235 | 230 | 275 | 224 |
| | Temperature of liquid reaction mixture (internal temperature) in first stage | | ° C. | 220 | 220 | 220 | 220 | 220 | 250 | 220 |
| | Difference between maximum heat medium temperature and internal temperature in first stage | | ° C. | 30 | 18 | 28 | 15 | 10 | 25 | 4 |
| | Temperature of coolant introduced into reflux condenser | | ° C. | 100 | 100 | 100 | none | none | none | none |
| | Period from 1 kPa to polymerization termination | | min | 30 | 80 | 25 | 180* | 180* | 180* | 80 |
| Poly-carbonate resin | Molar proportion in percentage of structural units derived from each dihydroxy compound | ISB (a) | mol % | 70.5 | 70.6 | 70.0 | 72.0 | 71.5 | 76.3 | 71.0 |
| | | CHDM (b) | | — | 29.4 | 30.0 | 28.0 | 28.5 | 23.7 | 29.0 |
| | | DEG (c) | | 29.5 | — | — | — | — | — | — |
| | Difference of proportion of structural units of each dihydroxy compound | \|(a − A)/A\| | — | 0.007 | 0.009 | 0.000 | 0.029 | 0.021 | 0.090 | 0.014 |
| | | \|(b − B)/B\| | | — | 0.020 | 0.000 | 0.067 | 0.050 | 0.210 | 0.033 |
| | | \|(c − C)/C\| | | 0.017 | — | — | — | — | — | — |
| | Concentration of Na, K, and Cs (total) | | wt ppm | 0.3 | 2.5 | 0.6 | 2.5 | 0.6 | 0.6 | 0.8 |
| | Concentration of Li | | wt ppm | <0.05 | <0.05 | <0.05 | <0.05 | <0.05 | <0.05 | <0.05 |
| | (Amount of phenol distilled off in first stage)/(theoretical distillation removal amount) | | wt % | 95 | 89 | 98 | 86 | 87 | 98 | 90 |

TABLE 4-continued

|  |  |  |  |  |  |  |  |  |
|---|---|---|---|---|---|---|---|---|
|  | (Total amount of monomers distilled off)/(sum of starting-material monomers) | wt % | 0.8 | 1.6 | 0.4 | 17.0 | 10.5 | 13.3 | 1.7 |
|  | Reduced viscosity | dL/g | 0.62 | 0.48 | 0.50 | 0.42 | 0.45 | 0.29 | 0.48 |
|  | Concentration of terminal phenyl groups | µeq/g | 90 | 108 | 50 | 181 | 169 | — | — |
| Molded article | Light transmittance at 350 nm | % | 70 | 47 | 48 | 48 | 55 | — | — |
|  | Light transmittance at 320 nm | % | 50 | 19 | 22 | 16 | 25 | — | — |
|  | L* value | — | 96.5 | 96.2 | 95.5 | 95.8 | 96.0 | — | — |
|  | YI | — | 4.9 | 8.0 | 12.0 | 10.5 | 8.8 | — | — |
|  | YI value after metal halide lamp irradiation | — | 7.5 | 11.7 | 17.0 | 15.0 | 13.0 | — | — |
|  | Difference in YI value between before and after metal halide lamp irradiation | — | 2.6 | 3.7 | 5.0 | 4.5 | 4.2 | — | — |

*Given power was not reached.

While the invention has been described in detail and with reference to specific embodiments thereof, it will be apparent to one skilled in the art that various changes and modifications can be made therein without departing from the spirit and scope thereof. This application is based on a Japanese patent application filed on Nov. 30, 2009 (Application No. 2009-272413), a Japanese patent application filed on Nov. 30, 2009 (Application No. 2009-272414), a Japanese patent application filed on Nov. 30, 2009 (Application No. 2009-272415), and a Japanese patent application filed on Dec. 11, 2009 (Application No. 2009-281977), the contents thereof being incorporated herein by reference.

INDUSTRIAL APPLICABILITY

The polycarbonate resins of the invention have excellent transparency, hue, heat resistance, thermal stability, and mechanical strength and further have excellent optical properties. Consequently, it is possible to provide materials for use in a wide range of fields including the field of injection molding, such as electrical/electronic parts and automotive parts, the field of films and sheets, the field of bottles and containers in which heat resistance is required, lens applications such as camera lenses, finder lenses, and lenses for CCDs or CMOSs, films or sheets such as retardation films, diffusing sheets, and polarizing films which are utilized in liquid-crystal or plasma displays and the like, optical disks, optical materials, optical parts, and binders for fixing colorants, charge transfer agents, etc.

Furthermore, according to the processes for polycarbonate resin production of the invention, it is possible to efficiently and stably produce a polycarbonate resin which has excellent light resistance, transparency, hue, heat resistance, thermal stability, and mechanical strength and which stably shows these performances.

The invention claimed is:

1. A polycarbonate resin comprising:
   structural units derived from a dihydroxy compound having a portion represented by formula (1) as part of the structure thereof:

 (1)

wherein the portion represented by formula (1) is not part of —CH$_2$—O—H is; and
   an aromatic monohydroxy compound in an positive amount of 700 weight ppm or less;
   wherein the polycarbonate resin is obtained using at least one metal compound selected from the group consisting of a magnesium compound and a calcium compound as a catalyst, and the polycarbonate resin has a total positive content of lithium, sodium, potassium, and cesium of 1 weight ppm or less in terms of metal amount, and
   wherein a molded object, having a thickness of 3 mm, obtained from said polycarbonate resin has a light transmittance, as measured at a wavelength of 350 nm, of 65% or higher.

2. The polycarbonate resin according to claim 1, wherein the molded object has a light transmittance, as measured at a wavelength of 320 nm, of 30% or higher.

3. The polycarbonate resin according to claim 1, wherein the molded object has a yellowness index (YI) value, as measured with respect to transmitted light in accordance with ASTM D1925-70, of 12 or less after having been irradiated with light for 100 hours using a metal halide lamp in an environment of 63° C. and a relative humidity of 50% at an irradiance for the wavelength range of 300-400 nm of 1.5 kW/m$^2$.

4. The polycarbonate resin according to claim 1, wherein the molded object has an initial yellowness index value of 10 or less.

5. The polycarbonate resin according to claim 1, wherein the difference between the initial yellowness index value of the molded object and the yellowness index (YI) value thereof measured with respect to transmitted light in accordance with ASTM D1925-70 after the molded object has been irradiated with light for 100 hours using a metal halide lamp in an environment of 63° C. and a relative humidity of 50% at an irradiance for the wavelength range of 300-400 nm of 1.5 kW/m$^2$ is 6 or less in terms of absolute value.

6. The polycarbonate resin according to claim 1, wherein the molded object has an L* value of 96.3 or higher.

7. A polycarbonate resin comprising:
   structural units derived from a dihydroxy compound having a portion represented by formula (1) as part of the structure thereof:

 (1)

wherein the portion represented by formula (1) is not part of —CH$_2$—O—H; and
   a carbonic diester represented by formula (2) in an amount of 60 weight ppm or less:

 (2)

wherein $A^1$ and $A^2$ each independently are a substituted or unsubstituted aliphatic group having 1-18 carbon atoms or a substituted or unsubstituted aromatic group;

wherein a molded object, having a thickness of 3 mm, obtained from said polycarbonate resin has a light transmittance, as measured at a wavelength of 350 nm, of 60% or higher.

8. A polycarbonate resin comprising structural units derived from a dihydroxy compound having a portion represented by formula (1) as part of the structure thereof:

(1)

wherein the portion represented by formula (1) is not part of —$CH_2$—O—H;

wherein said polycarbonate resin has a total positive content of sodium, potassium, and cesium of 1 weight ppm or less in terms of metal amount; and wherein a molded object, having a thickness of 3 mm, obtained from said polycarbonate resin has a light transmittance, as measured at a wavelength of 350 nm, of 60% or higher.

9. The polycarbonate resin according to claim 1, wherein the concentration of an end group represented by formula (3) in the polycarbonate resin is 20-160 μeq/g:

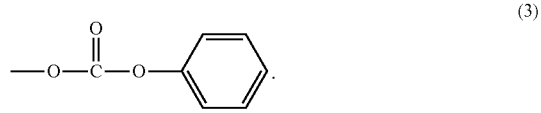
(3)

10. The polycarbonate resin according to claim 1 which satisfies A/(A+B)≤0.1, wherein A is the number of moles of H bonded to aromatic rings contained in the polycarbonate resin and B is the number of moles of H bonded to a part other than aromatic rings.

11. The polycarbonate resin according to claim 1, wherein the dihydroxy compound having the portion represented by formula (1) as part of the structure thereof is a dihydroxy compound represented by formula (4):

(4)

12. The polycarbonate resin according to claim 1 which further comprises structural units derived from at least one compound selected from the group consisting of an aliphatic dihydroxy compound and an alicyclic dihydroxy compound.

13. The polycarbonate resin according to claim 1 which is obtained by condensation-polymerizing a dihydroxy compound having the portion represented by formula (1) as part of the structure thereof with a carbonic diester represented by formula (2) in the presence of a catalyst:

(2)

wherein $A^1$ and $A^2$ each independently are a substituted or unsubstituted aliphatic group having 1-18 carbon atoms or a substituted or unsubstituted aromatic group.

14. The polycarbonate resin according to claim 13, wherein the catalyst comprises one or more compounds of at least one metal selected from the group consisting of lithium and the Group-2 metals of the long-form periodic table, and the total amount of said one or more compounds is 20 μmol or less in terms of metal amount per mole of the dihydroxy compound used.

15. The polycarbonate resin according to claim 7, wherein the molded object has a light transmittance, as measured at a wavelength of 320 nm, of 30% or higher.

16. The polycarbonate resin according to claim 7, wherein the molded object has a yellowness index (YI) value, as measured with respect to transmitted light in accordance with ASTM D1925-70, of 12 or less after having been irradiated with light for 100 hours using a metal halide lamp in an environment of 63° C. and a relative humidity of 50% at an irradiance for the wavelength range of 300-400 nm of 1.5 kW/m².

17. The polycarbonate resin according to claim 7, wherein the difference between the initial yellowness index value of the molded object and the yellowness index (YI) value thereof measured with respect to transmitted light in accordance with ASTM D1925-70 after the molded object has been irradiated with light for 100 hours using a metal halide lamp in an environment of 63° C. and a relative humidity of 50% at an irradiance for the wavelength range of 300-400 nm of 1.5 kW/m² is 6 or less in terms of absolute value.

18. The polycarbonate resin according to claim 7, wherein the molded object has an L* value of 96.3 or higher.

19. The polycarbonate resin according to claim 7 which has a total positive content of sodium, potassium, and cesium of 1 weight ppm or less in terms of metal amount.

20. The polycarbonate resin according to claim 7, wherein the concentration of an end group represented by formula (3) in the polycarbonate resin is 20-160 μeq/g:

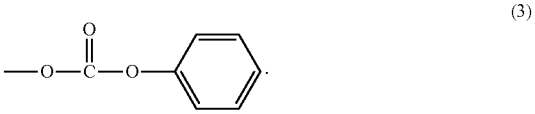
(3)

21. The polycarbonate resin according to claim 7 which satisfies A/(A+B)≤0.1, wherein A is the number of moles of H bonded to aromatic rings contained in the polycarbonate resin and B is the number of moles of H bonded to a part other than aromatic rings.

22. The polycarbonate resin according to claim 7 which further comprises structural units derived from at least one compound selected from the group consisting of an aliphatic dihydroxy compound and an alicyclic dihydroxy compound.

23. The polycarbonate resin according to claim 7 which is obtained by condensation-polymerizing a dihydroxy compound having the portion represented by formula (1) as part of the structure thereof with a carbonic diester represented by formula (2) in the presence of a catalyst:

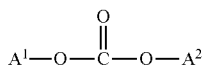

(2)

wherein $A^1$ and $A^2$ each independently are a substituted or unsubstituted aliphatic group having 1-18 carbon atoms or a substituted or unsubstituted aromatic group;

wherein the catalyst comprises one or more compounds of at least one metal selected from the group consisting of lithium and the Group-2 metals of the long-form periodic table; and wherein the total amount of said one or more compounds is 20 µmol or less in terms of metal amount per mole of the dihydroxy compound used.

24. The polycarbonate resin according to claim 7 which has been obtained using as a catalyst at least one metal compound selected from the group consisting of a magnesium compound and a calcium compound, wherein the polycarbonate resin has a total positive content of lithium, sodium, potassium, and cesium of 1 weight ppm or less in terms of metal amount.

25. The polycarbonate resin according to claim 8, wherein the molded object has a light transmittance, as measured at a wavelength of 320 nm, of 30% or higher.

26. The polycarbonate resin according to claim 8, wherein the molded object has a yellowness index (YI) value, as measured with respect to transmitted light in accordance with ASTM D1925-70, of 12 or less after having been irradiated with light for 100 hours using a metal halide lamp in an environment of 63° C. and a relative humidity of 50% at an irradiance for the wavelength range of 300-400 nm of 1.5 kW/m².

27. The polycarbonate resin according to claim 8, wherein the difference between the initial yellowness index value of the molded object and the yellowness index (YI) value thereof measured with respect to transmitted light in accordance with ASTM D1925-70 after the molded object has been irradiated with light for 100 hours using a metal halide lamp in an environment of 63° C. and a relative humidity of 50% at an irradiance for the wavelength range of 300-400 nm of 1.5 kW/m² is 6 or less in terms of absolute value.

28. The polycarbonate resin according to claim 8, wherein the molded object has an L* value of 96.3 or higher.

29. The polycarbonate resin according to claim 8, wherein the concentration of an end group represented by formula (3) in the polycarbonate resin is 20-160 µeq/g:

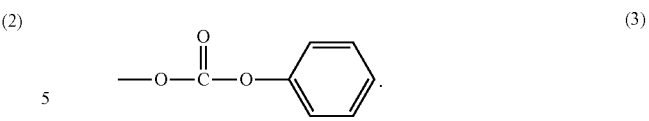

(3)

30. The polycarbonate resin according to claim 8 which satisfies A/(A+B)≤0.1, wherein A is the number of moles of H bonded to aromatic rings contained in the polycarbonate resin and B is the number of moles of H bonded to a part other than aromatic rings.

31. The polycarbonate resin according to claim 8 which further comprises structural units derived from at least one compound selected from the group consisting of an aliphatic dihydroxy compound and an alicyclic dihydroxy compound.

32. The polycarbonate resin according to claim 8 which is obtained by condensation-polymerizing a dihydroxy compound having the portion represented by formula (1) as part of the structure thereof with a carbonic diester represented by formula (2) in the presence of a catalyst:

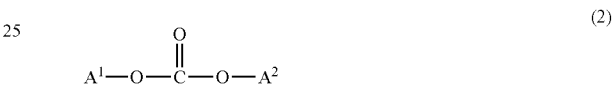

(2)

wherein $A^1$ and $A^2$ each independently are a substituted or unsubstituted aliphatic group having 1-18 carbon atoms or a substituted or unsubstituted aromatic group;

wherein the catalyst comprises one or more compounds of at least one metal selected from the group consisting of lithium and the Group-2 metals of the long-form periodic table; and wherein the total amount of said one or more compounds is 20 µmol or less in terms of metal amount per mole of the dihydroxy compound used.

33. The polycarbonate resin according to claim 8 which has been obtained using as a catalyst at least one metal compound selected from the group consisting of a magnesium compound and a calcium compound, wherein the polycarbonate resin has a total positive content of lithium, sodium, potassium, and cesium of 1 weight ppm or less in terms of metal amount.

* * * * *